(12) United States Patent
Tathuzaki

(10) Patent No.: US 8,662,051 B2
(45) Date of Patent: Mar. 4, 2014

(54) ROTARY ENGINE

(76) Inventor: Seiki Tathuzaki, Tokyo (JP)

( * ) Notice: Subject to any disclaimer, the term of this patent is extended or adjusted under 35 U.S.C. 154(b) by 232 days.

(21) Appl. No.: 13/272,997

(22) Filed: Oct. 13, 2011

(65) Prior Publication Data

US 2013/0092122 A1    Apr. 18, 2013

(51) Int. Cl.
*F02B 53/04* (2006.01)
(52) U.S. Cl.
USPC .......................................... 123/228; 123/241
(58) Field of Classification Search
USPC ................................................. 123/241, 228
See application file for complete search history.

(56) References Cited

U.S. PATENT DOCUMENTS

| | | | |
|---|---|---|---|
| 1,309,096 A * | 7/1919 | Leibing | 123/228 |
| 4,286,555 A * | 9/1981 | Williams | 123/228 |
| 6,062,188 A * | 5/2000 | Okamura | 123/228 |
| 7,308,884 B2 | 12/2007 | Tathuzaki | |
| 7,500,462 B2 * | 3/2009 | Karnes | 123/241 |

FOREIGN PATENT DOCUMENTS

WO   WO 2007/099634 A1   9/2007

* cited by examiner

*Primary Examiner* — Thai Ba Trieu
*Assistant Examiner* — Ngoc T Nguyen
(74) *Attorney, Agent, or Firm* — Birch, Stewart, Kolasch & Birch, LLP

(57) ABSTRACT

In a rotary engine 1, a flywheel rotor 4 is arranged inside a cylinder 2 formed inside a housing 3 of the rotary engine, and together with forming a circular space 7 between the flywheel rotor 4 and the inner wall 6 of the cylinder, is integrated into a single unit with a piston head 8 that comes in contact with the inner wall 6. From the upstream side in the direction of rotation of the rotor, an exhaust valve 60, an explosion pressure stopper valve 40 and a fuel-intake and circular-space closing valve 20 are provided in the cylinder 2, and each of these valves operate via active pins 24, 44, 64 engaged in guide grooves 30, 50 on the outer surface of the rotor and guide groove 71 on a cam 70 on the output shaft 5, to execute each of the processes intake-exhaust, compression and explosive combustion.

7 Claims, 19 Drawing Sheets

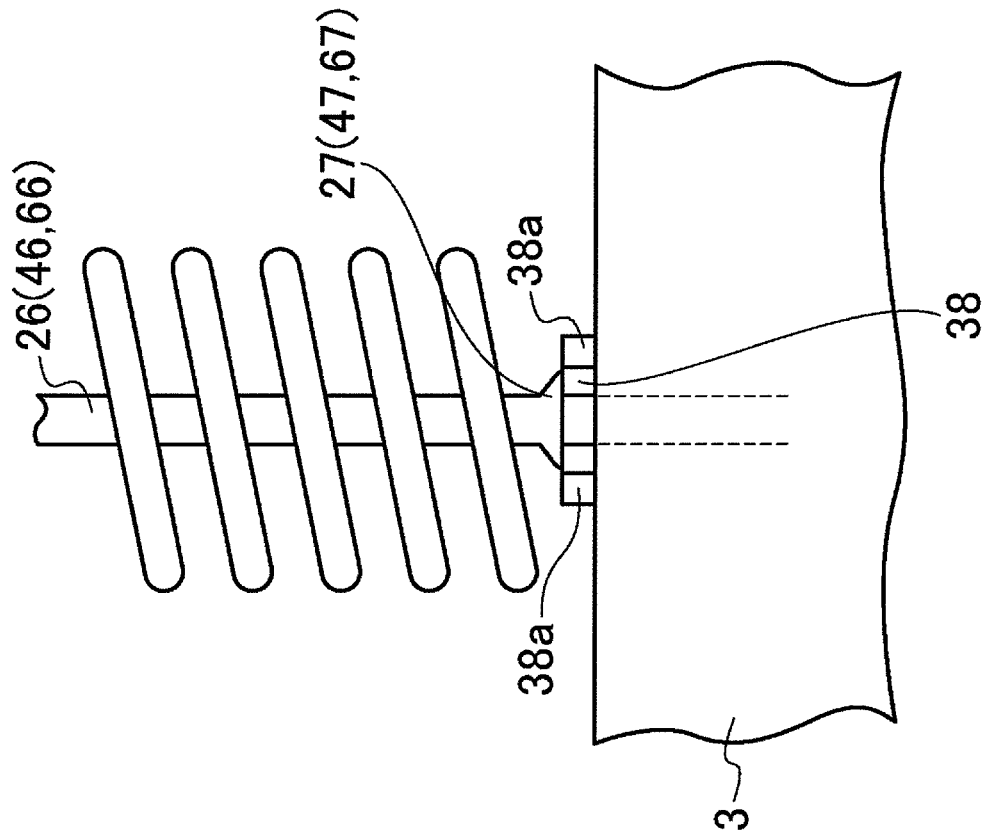
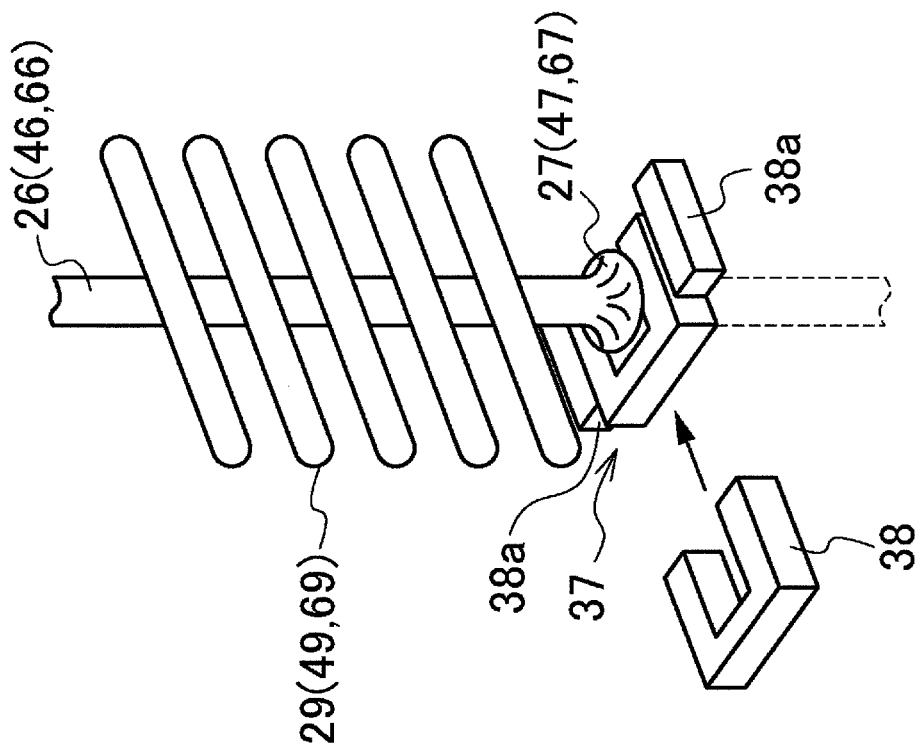
Fig. 9 (a)
Fig. 9 (b)

ROTARY ENGINE

BACKGROUND OF THE INVENTION

1. Field of the Invention

The present invention relates to a rotary engine in which a cylindrical-shaped flywheel rotor is placed inside a cylinder.

2. Description of the Related Art

Conventionally, a rotary engine, in which a triangular-shaped rotor is placed inside a cylindrical-shaped cylinder with the three vertices of the rotor coming in contact with the inner wall of the cylinder as the rotor turns, has been known. However, in this kind of rotary engine, since the three vertices of the rotor come in frictional contact with the inner wall of the cylinder, there is a problem in that energy loss due to friction, durability and fuel efficiency of the engine become worse than in than in the case of a reciprocating engine, as well as construction is complicated making it difficult to produce.

Therefore, the inventors of the present invention have invented several flywheel engines in which a cylindrical-shaped flywheel rotor is placed inside a cylindrical-shaped cylinder, with a circular space being formed between the rotor and inner wall of the cylinder; for example one such invention is an engine having a floating-type piston head that is provided on the outer perimeter of the rotor and that is capable of moving into contact with or moving away from the inner wall of the cylinder (see WO/JP2007/099634).

This proposed rotary engine brings fuel mixed with air into the circular space during the first rotation of the rotor, while at the same time, a piston head pushes exhaust gas that occurred during the previous combustion of fuel, and discharges that exhaust gas through an exhaust valve from the circular space into an exhaust pipe. During the second rotation of the rotor, with the circular space blocked on the downstream side in the rotational direction of the rotor near the combustion chamber, the rotary engine compresses the fuel with the piston head until it is close to the combustion chamber, then blocks the circular space on the upstream side in the rotation direction of the rotor near the combustion chamber, while at the same time causing the piston head to move back from the rotor and then stick out again, feeding the compressed fuel to the rear surface side of the floater. During the third rotation of the rotor, at the instant that the piston head passes the combustion chamber, the spark plug ignites the fuel and causes explosive combustion, and this explosive combustion of the fuel on the rear surface side of the piston head generates a propulsion force. By going through each of the processes, intake-exhaust, compression and explosive combustion, a rotational output is obtained in the output shaft of the rotor.

The proposed rotary engine described above has the advantage in that it is possible to obtain a large force even with a small explosive force, as well as obtain good durability with little friction loss along the inner wall of the cylinder. However, the piston head of the rotor is made such that it is movable, so there is a problem in that construction is complicated.

SUMMARY OF THE INVENTION

In consideration of the problems described above, it is the object of the present invention to provide a flywheel type of rotary engine that is capable of obtaining a large force using simple construction by performing the processes, intake-exhaust, compression and explosive combustion without having a movable type of piston head in the rotor.

In order to solve the problems described above, the rotary engine of the present invention comprises: a rotor housing having a cylindrical cylinder in which a fuel-intake path and an exhaust-gas discharge path that open up into that cylinder are formed, and a combustion chamber that opens into the inner wall of the cylinder is formed between the opening of the fuel-intake path and the exhaust-gas discharge path; a cylindrical flywheel rotor that is located on an output shaft that passes through the center of the cylinder, and together with forming a circular space between the flywheel rotor and inner wall of the cylinder, has a piston head that is formed at a location on the outer surface of the flywheel rotor such that the piston head comes in contact with the inner wall of the cylinder; a spark plug that is provided in the cylinder such that the tip end thereof is inside the combustion chamber; a fuel-intake and circular-space closing valve that is located in the cylinder near the combustion chamber on the downstream side in the direction of rotation of the rotor such that it can freely move out of or back into the cylinder, and can be switched between a first position and a second position, the first position being capable of selecting a state of opening the fuel-intake path and closing the circular space between the opening of the fuel-intake path and the opening of the combustion chamber and another state of blocking the fuel-intake path and opening the circular space, and the second position blocking the fuel-intake path and closing the circular space; fuel-intake and circular-space closing valve drive means for operating the fuel-intake and circular-space closing valve; an explosion pressure stopper valve that is located in the cylinder near the combustion chamber on the upstream side in the direction of rotation of the rotor such that it can freely move out of or back into the cylinder, and can be switched between closing and opening the circular space; explosion pressure stopper valve drive means for operating the explosion pressure stopper valve; an exhaust valve that opens and closes the discharge path; and exhaust valve drive means for operating the exhaust valve; wherein by operating the fuel-intake and circular-space closing valve, the explosion pressure stopper valve and the exhaust valve, it is possible to selectively perform: a fuel-intake and exhaust-gas discharge process wherein, with the fuel-intake and circular-space closing valve in the first position, the explosion pressure stopper valve closes the circular space and the exhaust valve opens the discharge path; a compression process wherein, with the fuel-intake and circular-space closing valve in the second position, the explosion pressure stopper valve opens the circular space and the exhaust valve closes the discharge path; and an explosive combustion process wherein, with the fuel-intake and circular-space closing valve in the first position, the explosion pressure stopper valve closes the circular space; and in this explosive combustion process the spark plug fires.

With the rotary engine of the present invention it is possible to perform each of the processes intake-exhaust, compression and explosive combustion and obtain large output with simpler construction, as well as it is possible to make the engine more compact.

BRIEF DESCRIPTION OF THE DRAWINGS

FIG. 9 is a pictorial drawing and front view of a drive-pin stopping means of the driving means for a fuel-intake and circular-space closing value.

DETAILED DESCRIPTION OF THE INVENTION

An embodiment of the present invention will be explained below with reference to the supplied drawings.

Figure 1:
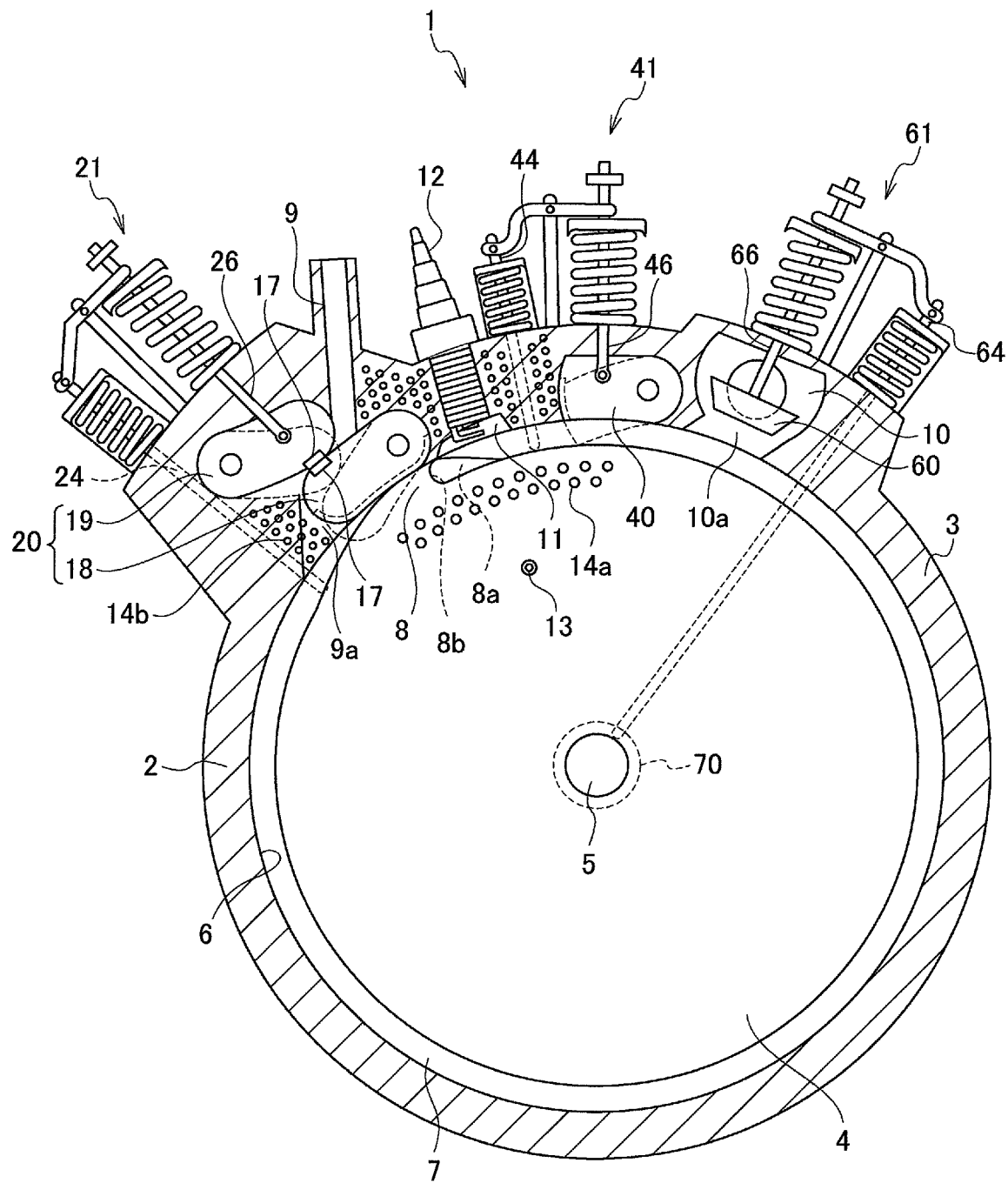
FIG. 1 is a cross-sectional drawing showing an embodiment of the rotary engine of the present invention.

FIG. 1 is a cross-sectional drawing showing an embodiment of the rotary engine of the present invention. As shown in FIG. 1, the rotary engine 1 comprises a rotor housing 3 having a cylindrical-shaped cylinder 2, with a cylindrical-shaped flywheel rotor 4 being placed concentrically inside the cylinder 2. This rotor 4 is fixed to an output shaft 5 that passes through the center of the cylinder 3, forming a circular space 7 between the outer surface of the rotor 4 and the inner wall 6 of the cylinder 2. A piston head 8 is integrally formed on part of the outer surface of the rotor 4, and that piston head 8 protrudes outward in a hill shape toward the circular space 7 and comes in contact with the inner wall 6 of the cylinder 2. A concave section 8a having a vertical wall 8b in the radial direction of the rotor is formed in the portion on the upstream side in the rotational direction of the rotor of the piston head 8. A fuel-intake path 9 and an exhaust gas discharge path 10 are formed in the housing 3 such that they open up into the cylinder 2, a combustion chamber 11 is formed such that it opens up into the inner wall 6 of the cylinder 2 between the opening 9a of the fuel-intake path 9 and the opening 10a of the exhaust gas discharge path 10, and a spark plug 12 is provided in the cylinder 2 such that the tip end thereof faces into the combustion chamber 11. Moreover, an electrode 13 (conductive carbon) is provided in the rotor 4, and coolant-oil paths 14a are provided in the peripheral edge section of the rotor between an oil ring and bearings (not shown in the figure). Coolant-air paths 14b are provided in the housing 3.

A fuel-intake and circular-space closing valve 20 and a fuel-intake and circular-space closing valve driving means 21 are provided in the cylinder 2 on the downstream side in the rotational direction of the rotor near the combustion chamber 11, and a explosion-pressure stopper valve 40 and explosion-pressure stopper valve driving means 41, and an exhaust valve 60 and exhaust valve driving means 61 are provided in the cylinder 2 on the upstream side in the rotational direction of the rotor.

Figure 2:
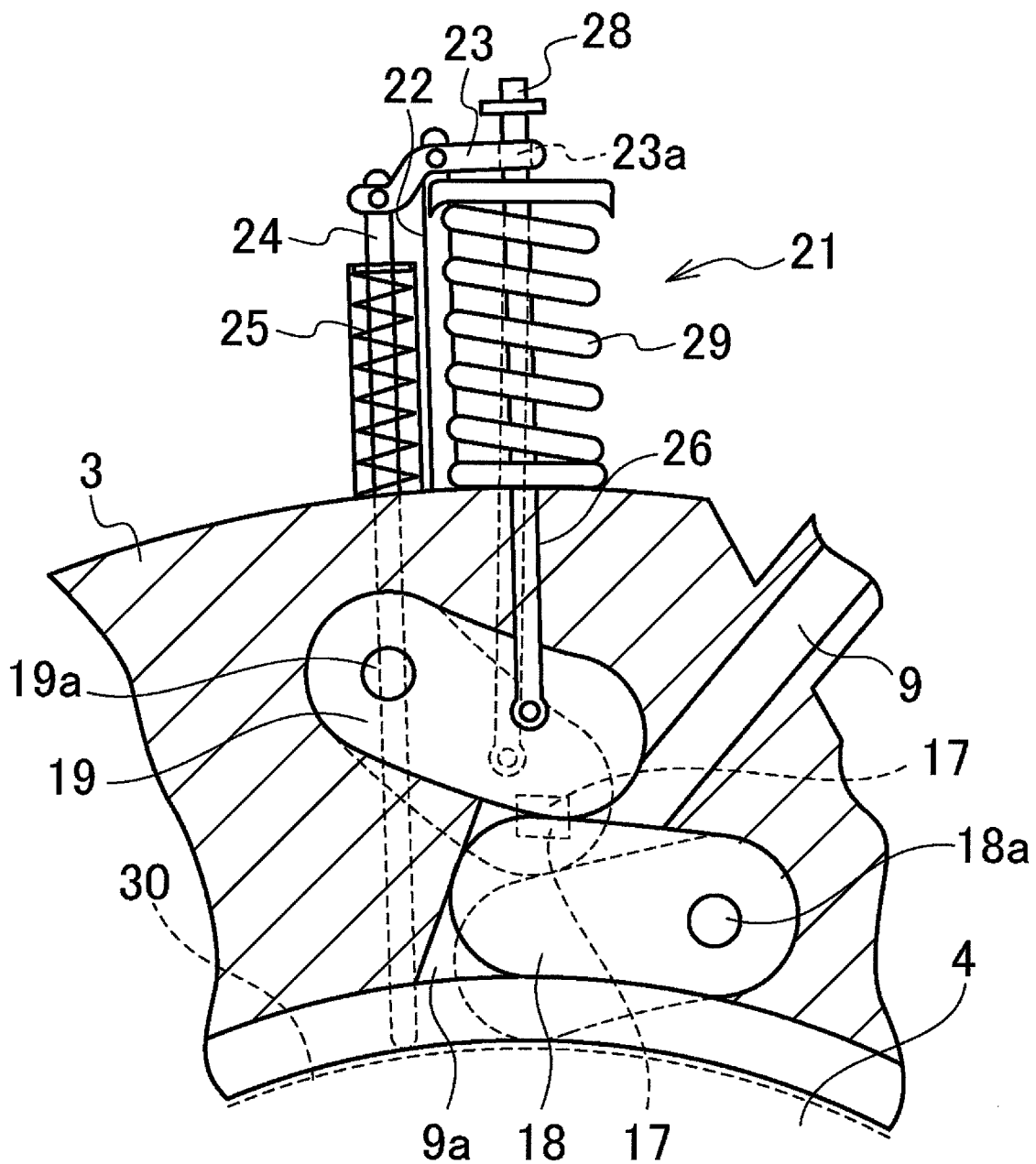
FIG. 2 is a cross-sectional drawing showing a fuel-intake and circular-space closing value, and the driving means thereof.

As shown in FIG. 2, the fuel-intake and circular-space closing valve 20 comprises: a free-pivoting circular-space closing valve 18, of which the pivot end side extends to the opening 9a of the fuel-intake path 9, having a support shaft 18a located on the upstream side in the rotational direction of the rotor from the opening 9a of the fuel-intake path 9 of the cylinder 2; and a fuel-intake valve 19, of which the pivot end side extends to the opening 9a of the fuel-intake path 9 above the fuel-intake and circular-space closing valve 18, having a support shaft 19a on the downstream side in the rotational direction of the rotor from the opening 9a of the fuel-intake path 9. On both of the opposing sides of the circular-space closing valve 18 and fuel-intake valve 19 there is a pair of magnets 17 that link the circular-space closing valve 18 and fuel-intake valve 19.

Figure 3:
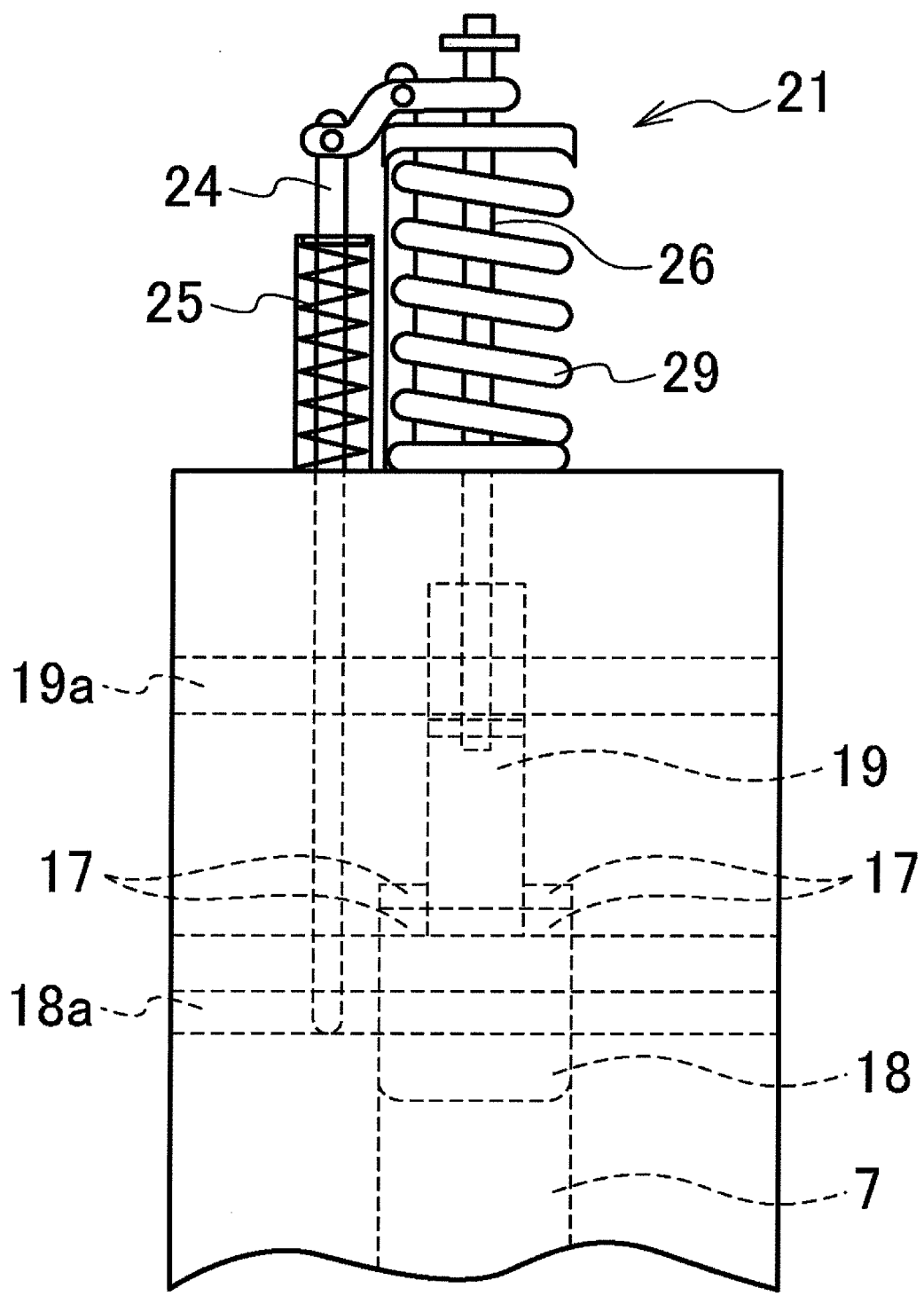
FIG. 3 is a side view showing the driving means for a fuel-intake and circular-space closing value.
Figure 4:
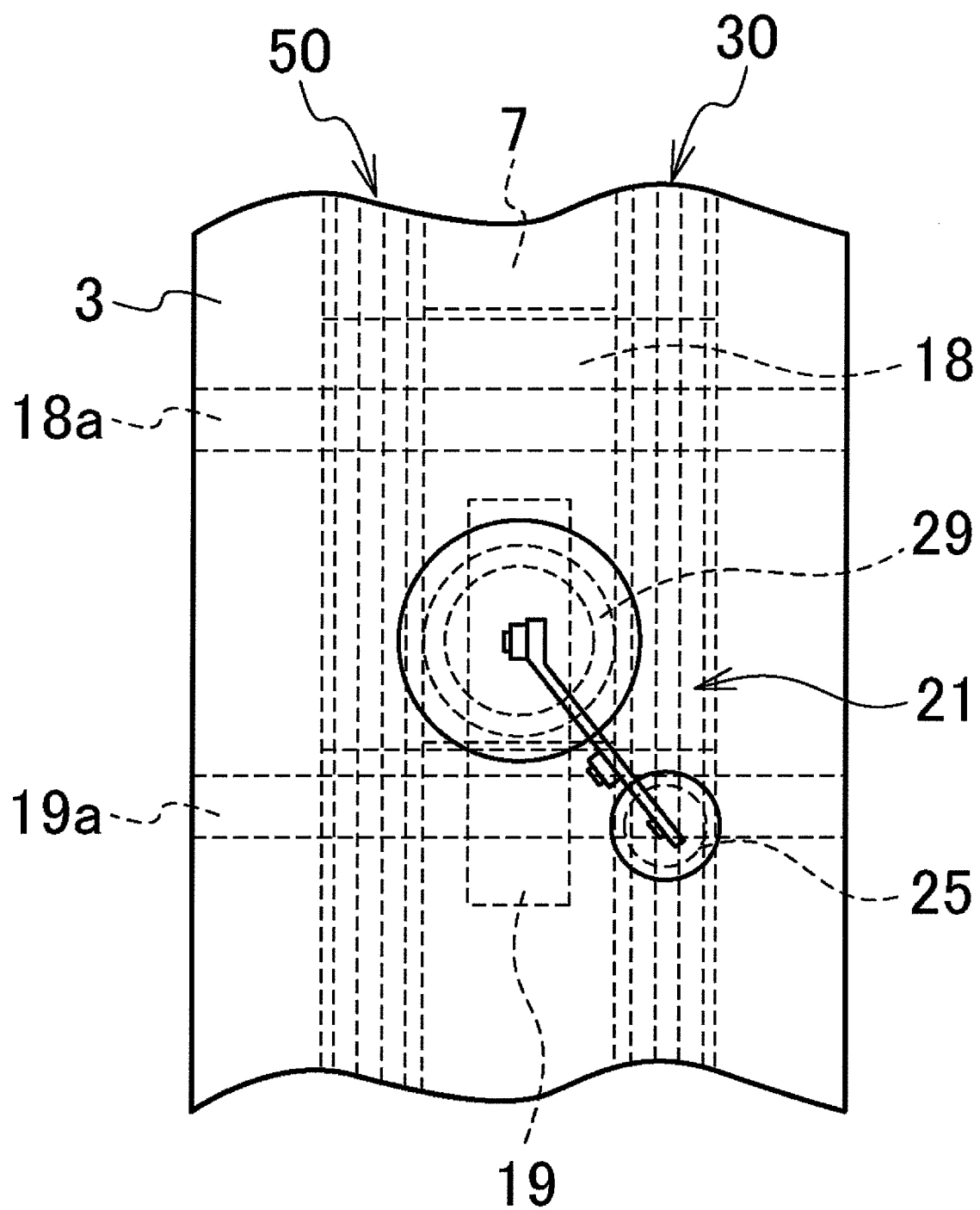
FIG. 4 is a top view showing the driving means for a fuel-intake and circular-space closing value.
Figure 5:
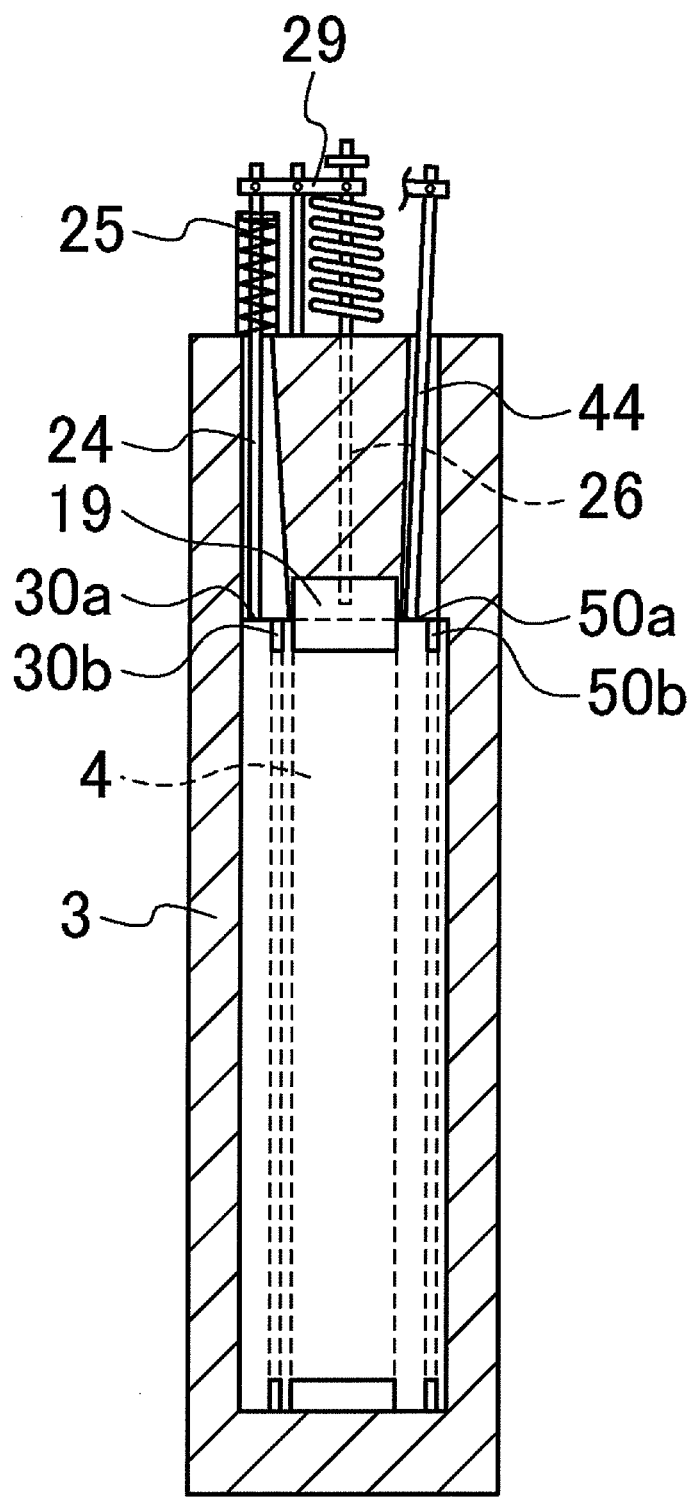
FIG. 5 is a cross-sectional drawing showing part of the driving means for a fuel-intake and circular-space closing value.
Figure 6:
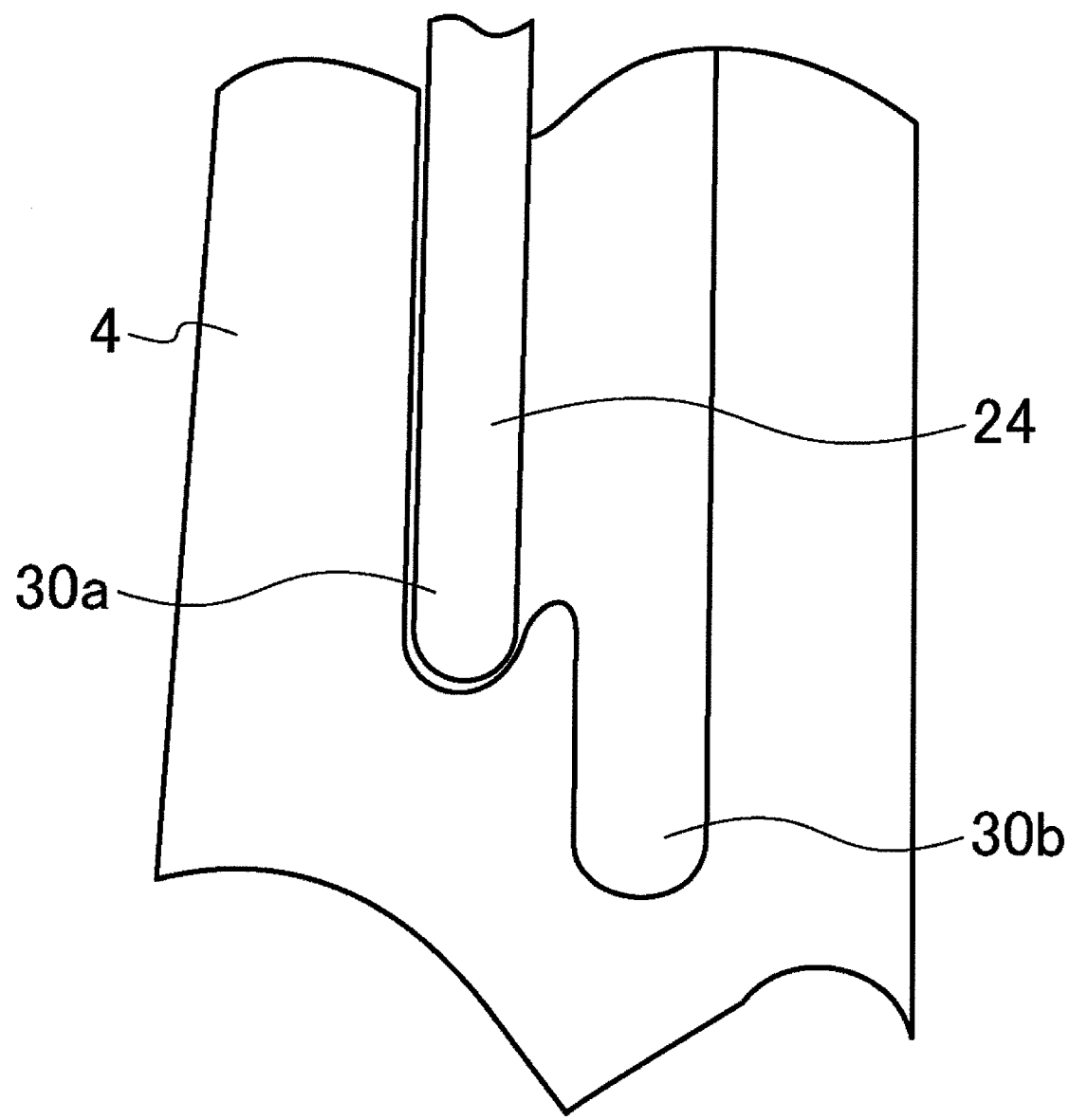
FIG. 6 is an explanative drawing showing an active pin that is inserted into a guide groove for the fuel-intake valve of the driving means for a fuel-intake and circular-space closing value.
Figure 7:
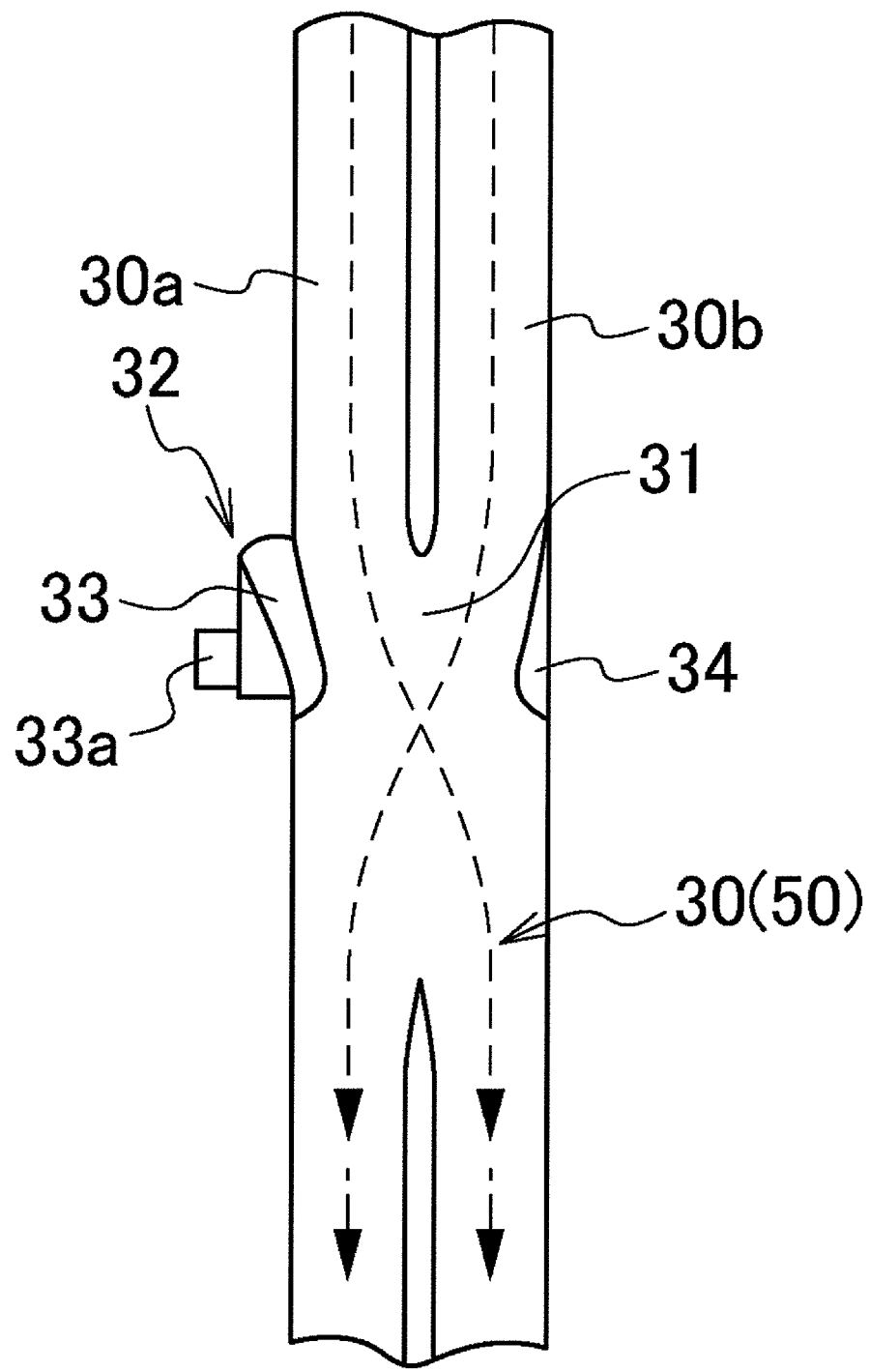
FIG. 7 is a top view showing the guide groove for the fuel-intake valve.

As shown in FIGS. 2, 3 and 4, the fuel-intake and circular-space closing valve driving means 21 comprises: a support rod 22 that is fastened to the housing 3, an arm 23 that is located on the top end of the support rod 22 so that it can pivot freely; an active pin 24 that is supported by one end of the arm 23 and the tip end thereof inserted inside fuel-intake valve guide groove 30 on one side of the outer surface of the rotor 4, and a driving pin 26, one end of which is linked to the fuel-intake valve 19, and the other end freely fits inside a hole 23a that is formed in the other end section of the arm 23 such that it can freely move up and down. A first spring 25 that is fastened to the housing 3 is attached to the active pin 24, and this first spring 25 presses the active pin 24 into the guide groove 30. The drive pin 26 comprises a flange section 27 (see FIG. 9) at the bottom of the pin→is provided with a flange section 27 at the bottom thereof, and comprises a stopper pin 28 in the part that protrudes outward from the arm 23, there is a second spring 29 located between the arm 23 and flange section 27, and this second spring 29 presses the drive pin 26 in the direction that causes the fuel-intake valve 19 to close the fuel-intake path 9. As shown in FIGS. 5, 6 and 7, the fuel-intake valve guide groove 30 comprises two grooves on one side of the outer surface of the rotor 4, a shallow concave groove 30a and a deep concave groove 30b, with the shallow concave groove 30a and the deep concave groove 30b being continuous with each other at a location in the circumferential direction.

Therefore, in the fuel-intake and circular-space closing valve drive means 21, when the active pin 24 is inserted into the shallow groove 30a of the guide groove 30, the active pin 24 moves upward against the pressing force of the first spring 25, the arm 23 pivots such that one end moves up and the other end moves down, the end of the arm 23 that moves down compresses the second spring 29, and the force of the compressed second spring 29 moves the drive pin 26 downward. As a result, the fuel-intake valve 19 pivots downward, and together with the fuel-intake valve 19 coming in contact with the circular-space closing valve 18 and the fuel-intake path 9 becoming blocked, the fuel-intake valve 19 presses the circular-space closing valve 18 causing the circular-space closing valve 18 to pivot downward and protrudes out from the cylinder 2, coming in contact with the outer surface of the rotor 4 and closing the circular space 7. In the compression process of the rotary engine 1, the fuel-intake and circular-space closing valve 20 takes a position in which it blocks the fuel-intake path 9 and closes the circular space 7 (second position of the fuel-intake and circular-space closing valve 20).

On the other hand, when the active pin 24 is inserted into the deep groove 30b of the guide groove 30, the force of the first spring 25 moves the active pin 24 downward, the arm 23 pivots such that one end moves down and the other end moves up, the end of the arm 23 that moves up comes in contact with the stopper pin 28 and presses the stopper pin 28 up, and the drive pin 26 moves upward against the force of the second spring 29. As a result, the fuel-intake valve 19 pivots upward releasing the pressure of the fuel-intake valve 19 on the circular-space closing valve 18 such that the circular-space closing valve 18 pivots freely. In this state, when the circular-space closing valve 18 is pivoted upward, the circular-space closing valve opens the circular space 7, the circular-space closing valve 18 and the fuel-intake valve 19 come in contact and are linked by the magnet 17 such that the circular-space closing valve 18 and fuel-intake valve 19 block the fuel-intake path 9 (first position of the fuel-intake and circular-space closing valve 20). This arrangement form (second arrangement form) of the fuel-intake and circular space closing value 20 is made possible when during the explosive combustion process the piston head 8 of the rotor 4 passes the fuel-intake and circular-space closing valve 20 and presses up on the circular-space closing valve 18 that is located in the circular space 7 causing the circular-space closing valve 18 to pivot upward. On the other hand, when causing the circular-space closing valve 18 to pivot downward from the state in which the circular-space closing valve 18 is in contact with the fuel-intake valve 19, the circular-space closing valve 18 opens the fuel-intake path 9, and the circular-space closing valve 18 closes the circular space 7 (first position of the fuel-intake and circular-space closing valve 20). This arrangement form (first arrangement form) of the fuel-intake valve and circular-space closing valve 20 is made possible when during the fuel-intake and exhaust gas discharge process, fuel enters the fuel-intake path 9, and the pressure of the fuel causes the circular-space closing valve 18 that is in contact with and linked to the fuel-intake valve 19 by the magnet 17 to pivot downward, separating the link with the fuel-intake valve 19.

Figure 8:
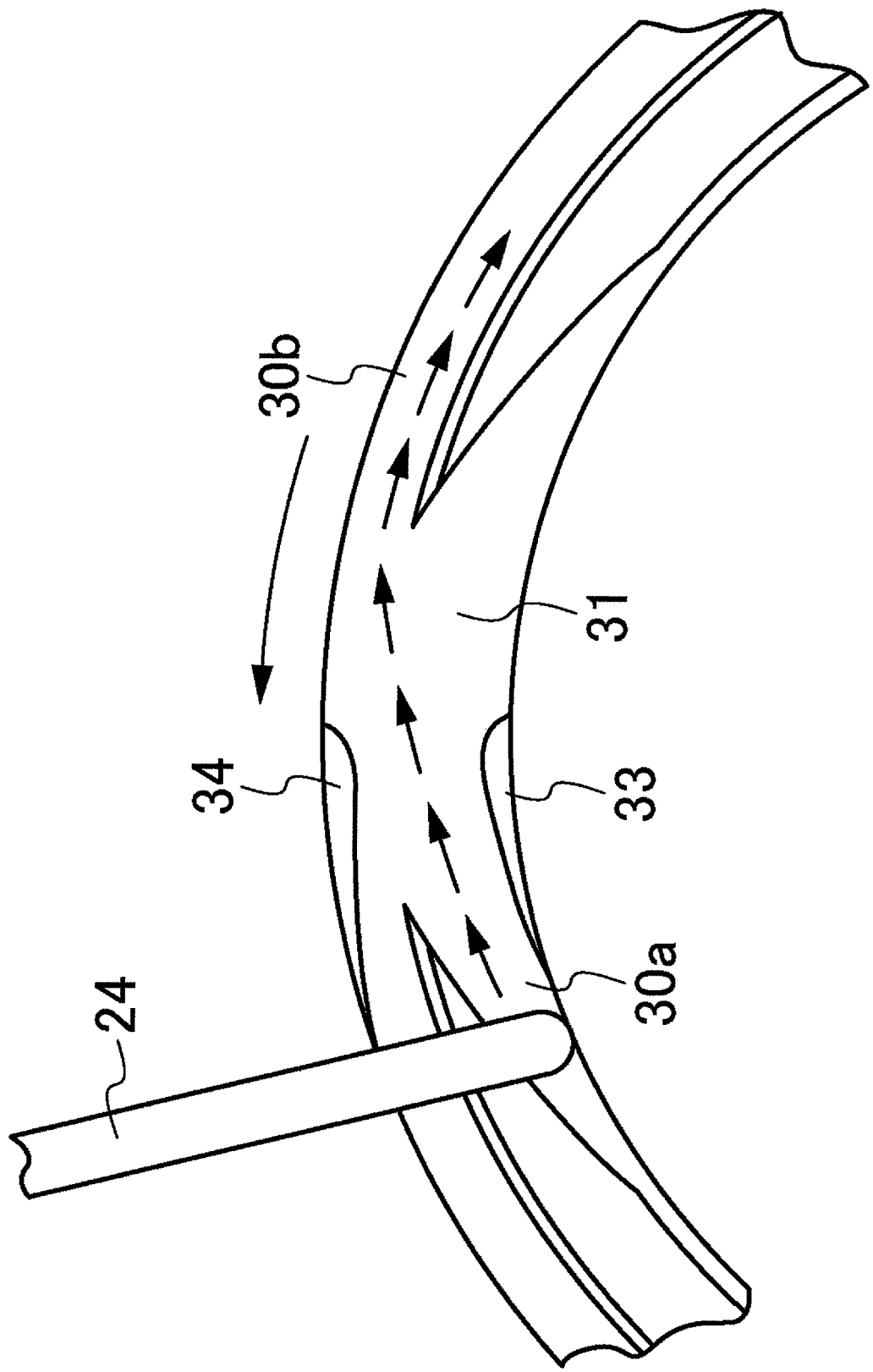
FIG. 8 is a drawing for explaining switching of the active pin in the guide groove for the fuel-intake valve.

Switching of the fuel-intake and circular-space closing valve 20 is executed by switching the active pin 34 between the shallow concave groove 30a and deep concave groove 30b of the guide groove 30. As shown in FIG. 7, a guide groove switching means 32 is provided in the continuous section 31 of the guide groove 30. The switching means 32 comprises: a moving guide piece 33 that is located on one side of the guide groove 30 and that can be freely moved in and out of the shallow concave groove 30a by a magnet 33a; and a stationary guide piece 34 that is located of the other side of the guide groove 30 and that protrudes out into the deep concave groove 30b. As shown in FIG. 8, when the active pin 24 is inserted into the shallow concave groove 30a, and the moving guide piece 33 protrudes into the shallow concave groove 30 at the instant when the continuous section 31 of the guide groove 30 reaches the active pin 24, the moving guide piece 33 changes the advancement path of the active pin 24 and guides it to the deep concave groove 30b. On the other hand, when the active pin 24 is moving along the deep concave groove 30b and the moving guide piece 33 is moved back from the shallow concave groove 30a at the instant when the continuous section 31 of the guide groove 30 reaches the active pin 24, the stationary guide piece 34 changes the advancement path of the active pin 24 to the shallow concave groove 30a. Switching the fuel-intake and circular-space closing valve 20 by switching the guide groove 30 is performed at the instant when the continuous section 31 of the guide groove 30 reaches the position shown by the line B-B' in FIG. 16.

As can be seen in FIG. 9, the drive pin 26 is provided with a drive pin stopping means 37 for automatically stopping the engine 1 when the rotary engine 1 reaches a specified high speed rotation (for example, 3000 rpm). This drive pin stopping means 37 comprises: a pair of bar magnets 38a that are located at the bottom of the flange section 27 of the drive pin 26 such that they are parallel and that there is a space between them; and a U-shaped retaining block 38 that is made from an electromagnet. When the electromagnet of the retaining block 38 is magnetized, the attraction force between that retaining block 38 and the bar magnets 38a causes the retaining block 38 to move against the force of a spring (not shown in the figure) that applies a force in the direction going away from the driving pin 26 and to enter in the space between the flange section 27 of the drive pin 26 and the housing 3, and when the retaining block 38 comes in contact with the bottom surface of the flange section 27, it stops the operation of the drive pin 26. When the electromagnet of the retaining block 38 is demagnetized, the force of the spring moves the retaining block 38 out from the space between the flange section 27 of the drive pin 26 and the housing 3 and operation of the drive pin 26 begins again.

Figure 10:
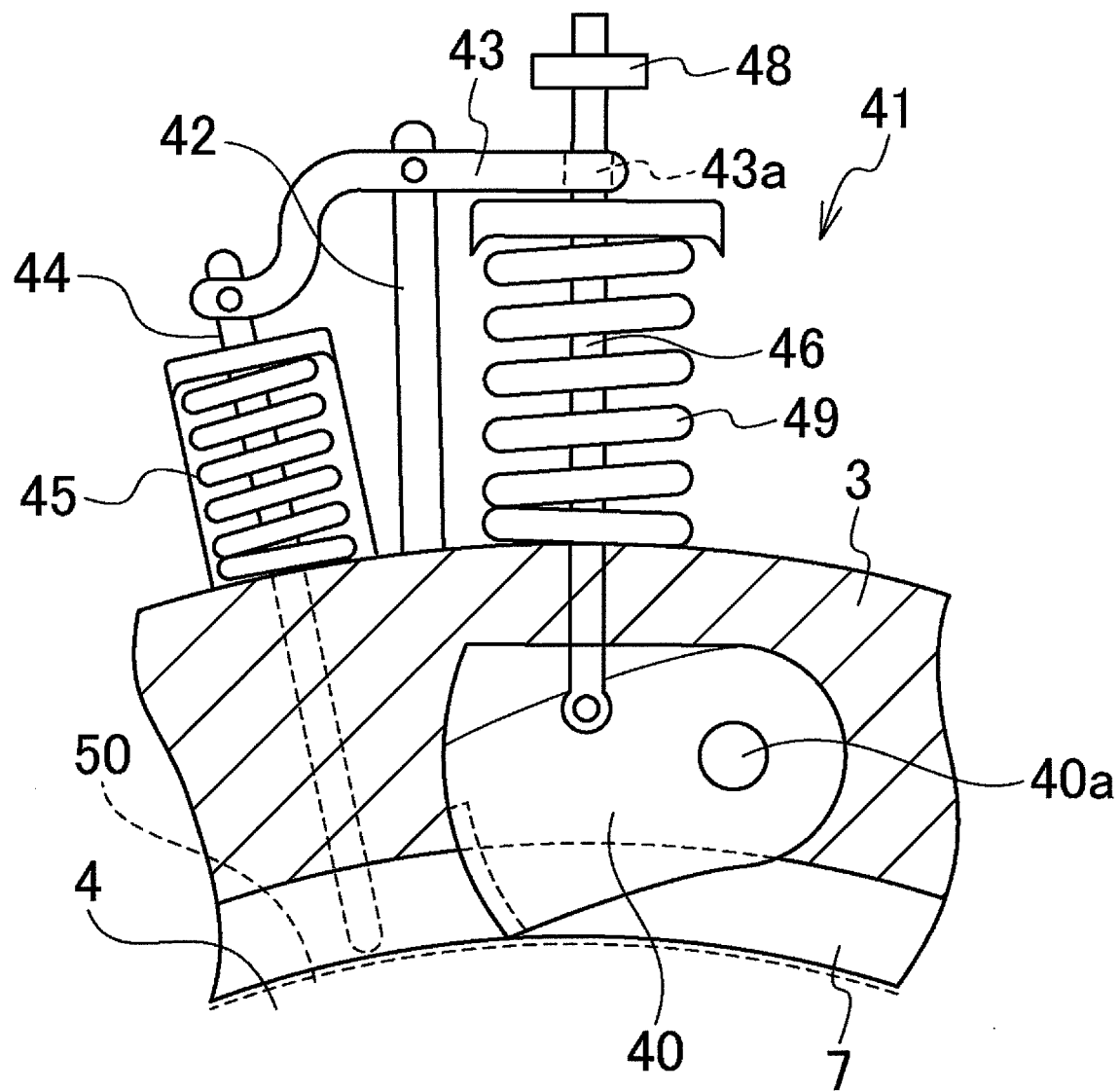
FIG. 10 is a cross-sectional drawing showing an explosion pressure stopper valve of the engine.
Figure 11:
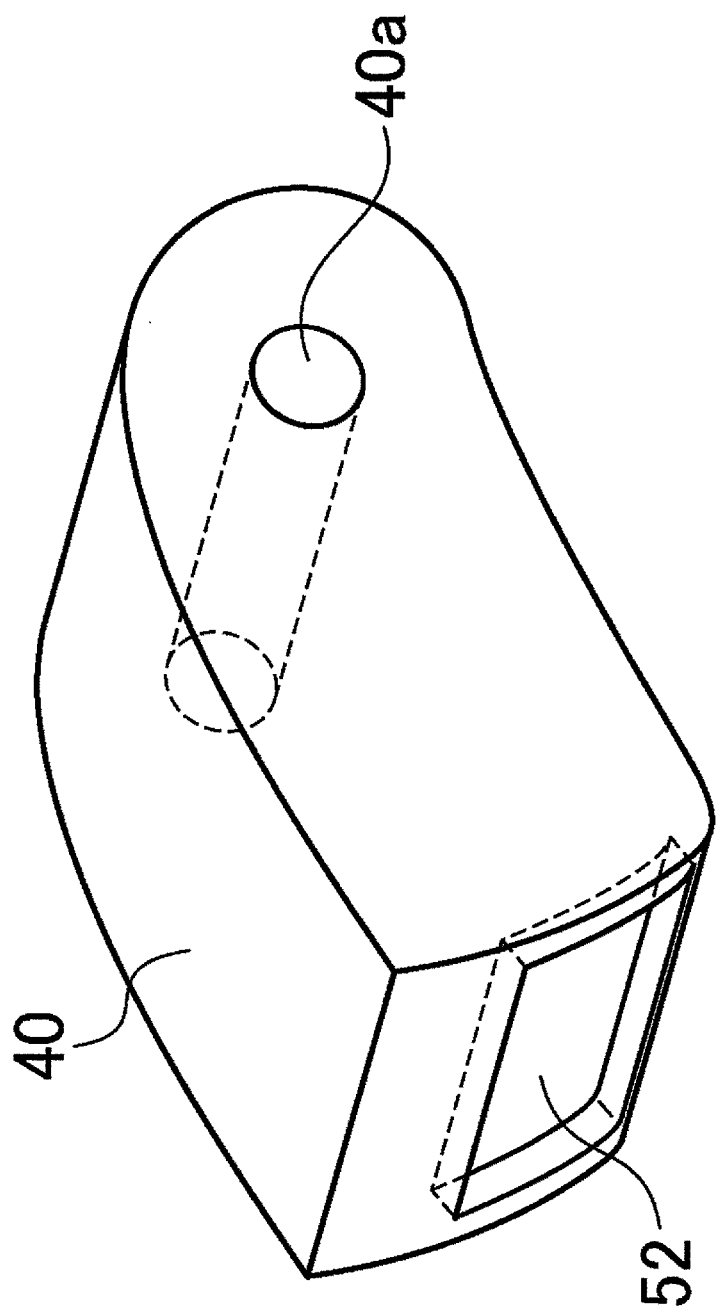
FIG. 11 is a pictorial drawing showing the explosion pressure stopper valve and driving means thereof.

As shown in FIG. 1 and FIG. 10, the explosion pressure stopper valve 40 is provided on the upstream side in the rotational direction of the rotor near the combustion chamber 11 of the cylinder 2, and capable of pivoting freely around a support shaft 40a. By pivoting downward, the explosion pressure stopper valve 40 protrudes from the cylinder 2 and comes in contact with the outer surface of the rotor 4 to close the circular space 7, and by pivoting upward, the explosion pressure stopper valve 40 moves back into the cylinder and opens the circular space 7. As shown in FIG. 11, a concave section 52 is formed on the surface on the downstream side in the rotational direction of the rotor of the explosion pressure stopper 40, and during explosive combustion of fuel, the concave section 52 expands in order to increase the seal of the circular space 7 by the explosion pressure stopper valve 40.

As shown in FIG. 10, the explosion pressure stopper valve drive means 41 is constructed to conform to the fuel-intake and circular-space closing valve drive means 21. The explosion pressure stopper valve drive means 41 comprises: a support rod 42 that is fastened to the housing 3; an arm 43 that is capable of pivoting freely and that is located at the top end of the support rod 42; an active pin 44 that is supported by one end of the arm 43 and the tip end of which is inserted into an explosion pressure stopper valve guide groove 50 on the other side of the outer surface of the rotor 4; and a drive pin 46, one end of which engages with the explosion pressure stopper valve 40, and the other end of which fits through a hole 43a that is formed on the other end of the arm 43 such that it can freely move up and down. A first spring 45 that is fastened to the housing 3 is attached to the active pin 44, and that first spring 45 presses the active pin 44 into a guide groove 50. The drive pin 46 comprises a stopper pin 48 in the section that protrudes outward from the arm 43, and as shown in FIG. 9, comprises a flange section 47 at the bottom. A second spring 49 that is located between the arm 43 and flange section 47 presses the drive pin 46 in a direction such that the explosion stopper valve 40 closes the circular space 7.

As shown in FIG. 4 and FIG. 5, except for being located opposite the fuel-intake valve guide groove 30 on the outer surface of the rotor 4, the explosion pressure stopper valve guide groove 50 has the same construction as the guide groove 30 for the fuel-intake and circular-space closing drive means 21. In other words, the guide groove 50 comprises two grooves, a shallow concave groove 50*a* and a deep concave groove 50*b*, that are continuous with each other at one location in the circumferential direction; and a switching means that is the same as the switching means 32 is provided in the continuous section between the shallow concave groove 50*a* and the deep concave groove 50*b* and switches the active pin 44 between the shallow concave groove 50*a* and the deep concave groove 50*b*.

Therefore, when the active pin 44 is inserted in the shallow concave groove 50*a* of the guide groove 50, the explosion pressure stopper valve 40 moves the active pin 44 upward against the force of the first spring 45, causing one end of the arm 43 to pivot upward and the other end to pivot downward such that the end of the arm 43 that pivots downward compresses the second spring 49, and the force of the compressed second spring 49 moves the drive pin 26 downward. By doing so, the explosion pressure stopper valve 40 pivots downward, causing the explosion pressure stopper valve 40 to protrude from the cylinder and come in contact with the rotor 4 and close the circular space 7. On the other hand, when the active pin 44 is inserted inside the deep concave groove 50*b*, the force of the first spring 45 moves the active pin 44 downward, causing one end of the arm 43 to pivot downward and the other end to pivot upward, and the end of the arm 43 that pivots upward comes in contact with and pushes the stopper pin 48 upward, which in turn causes the drive pin 46 to move upward against the force of the second spring 49. By doing so, the explosion pressure stopper valve 40 pivots upward, and the explosion pressure stopper valve 40 moves back into the cylinder 2 to open up the circular space 7. Switching the explosion pressure stopper valve 40 by switching the guide groove 50 is performed at the point when the continuous section of the guide groove 50 reaches the location shown by line A-A' in FIG. 15.

As with the drive pin 26 of the fuel-intake and circular-space closing valve drive means 21, the drive pin 46 is provided with a drive pin stopping means 37 for automatically stopping the engine 1 when the rotary engine 1 begins rotating at a specified high speed rotation. Similarly, when the electromagnet of the retaining block 38 of the drive pin stopping means 37 is magnetized, the attraction force of the bar magnets 38*a* move the retaining block 38 against the force of the spring (not shown in the figures) such that it moves in between the flange section 47 of the drive pin 46 and the housing 3, and this retaining block 38 comes in contact with the bottom surface of the flange section 47, which stops the operation of the drive pin 46. When the electromagnet of the retaining block 38 is demagnetized, the force of the spring moves the retaining block 38 back from between the flange section 47 of the drive pin 46 and the housing 3, which causes the drive pin 46 to operate again.

Figure 12:
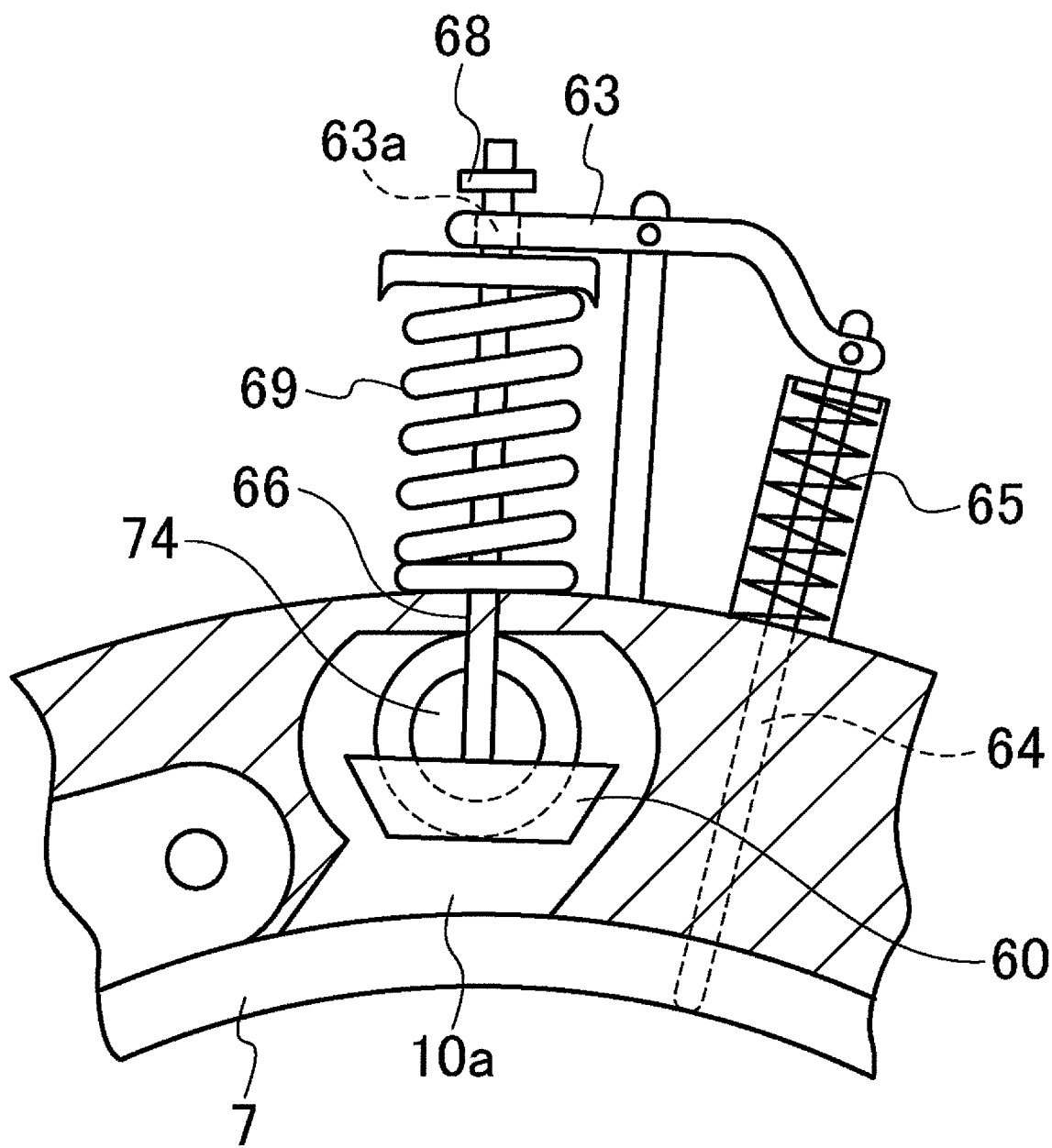
FIG. 12 is a cross-sectional drawing showing an exhaust valve of the engine and driving means thereof.

As shown in FIG. 12, the exhaust valve 60 is located in the exhaust gas discharge path 10 of the cylinder 2 such that it can freely move up and down. When the exhaust valve 60 moves downward, it comes in contact with the opening 10*a* of the discharge path 10 and closes the discharge path 10, and when the exhaust valve 60 moves upward, it moves away from the opening 10*a* of the discharge path 10 and opens the discharge path 10. A discharge pipe 74 that leads the exhaust gas outside the rotary engine 1 is attached to the discharge path 10.

Figure 13:
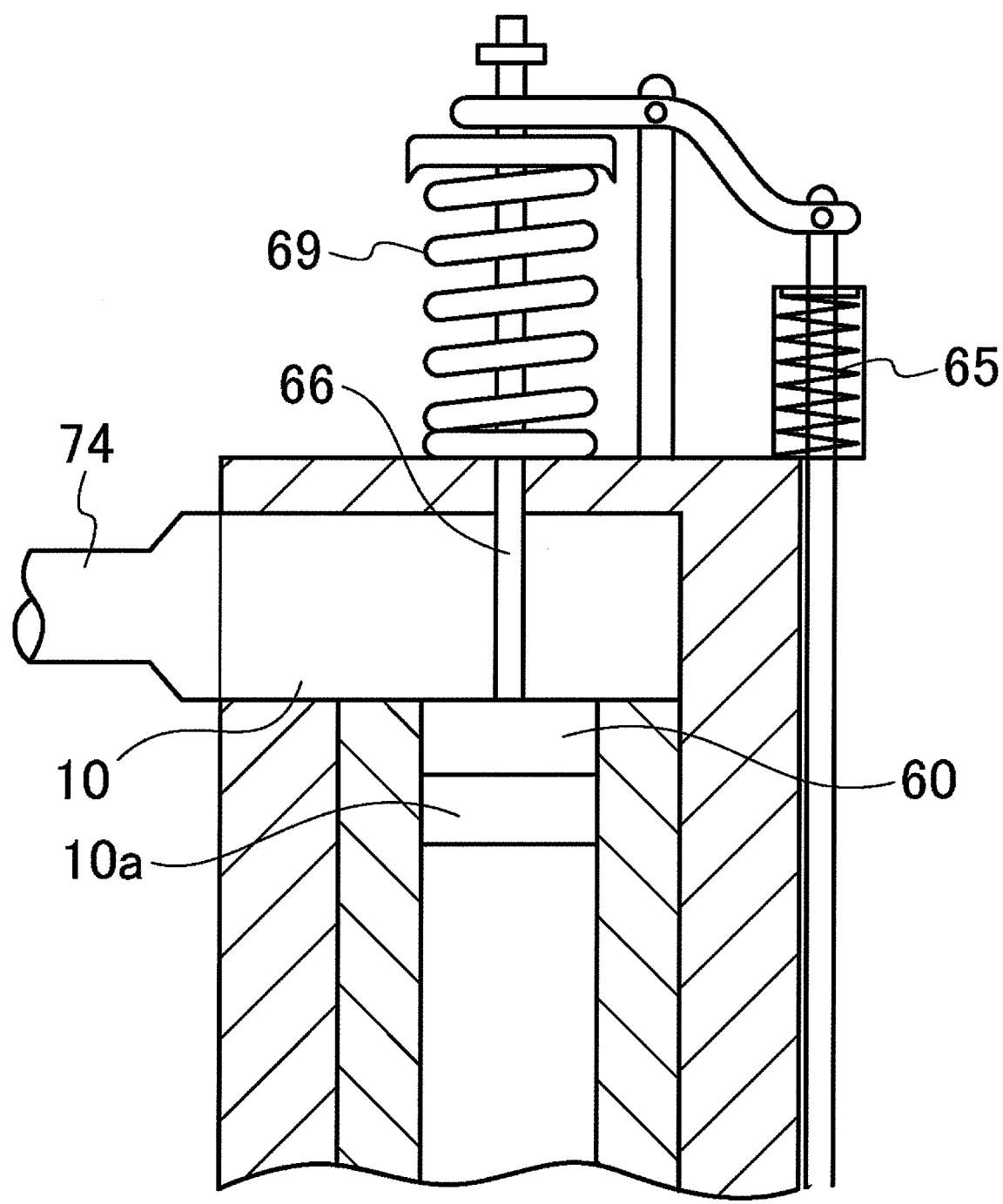
FIG. 13 is a cross-sectional drawing showing the exhaust valve.
Figure 14:
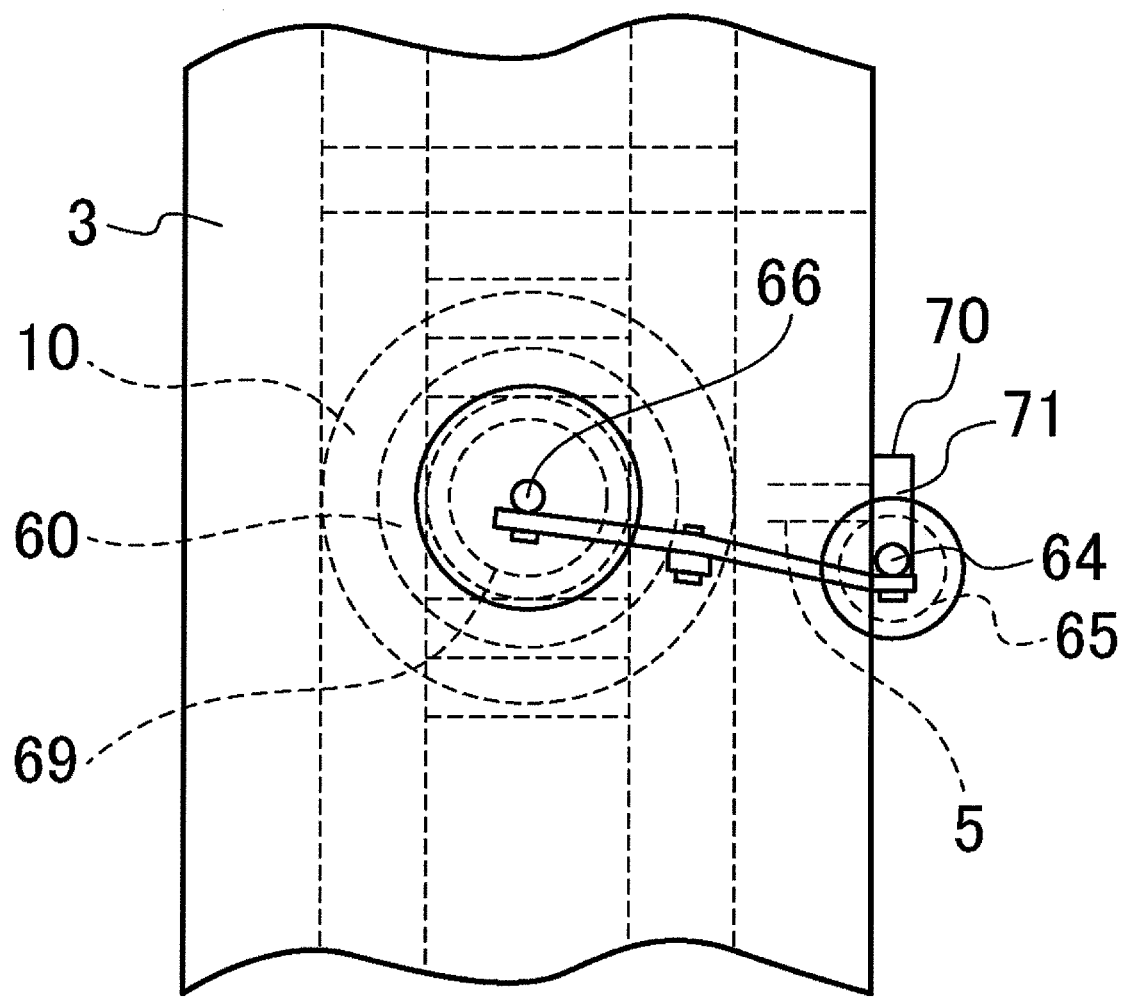
FIG. 14 is a top view showing the exhaust valve.

As shown in FIG. 12 and FIG. 13, the exhaust valve drive means 61 is constructed to conform to the fuel-intake and circular-space closing valve drive means 21. The exhaust valve drive means 61 comprises: a support rod 62 that is fixed to the housing 3; an arm 63 that is located at the top end of the support rod 62 such that it can pivot freely; an active pin 64 that is supported by one end of the arm 63, and as shown in FIG. 1 and FIG. 14, the tip end of which fits into a exhaust valve guide groove (cam groove) 71 of a cam that is provided on the outside end of the housing 3 of the output shaft 5 of the rotor 4; and a drive pin 66, one end of which fits in the exhaust valve 60, and the other end of which fits through a hole 63*a* that is formed on the other end of the arm 63 such that it can freely move up and down. A first spring 65 that is fastened to the housing 3 is attached to the active pin 64, and that first spring 65 presses the active pin 64 into the guide groove 71 of the cam 70. The drive pin 66 comprises a stopper pin 68 in the portion that protrudes outward from the arm 63, and as shown in FIG. 9, comprises a flange section 67 at the bottom. In addition, a second spring 69 that is located between the arm 63 and the flange section 67 presses the drive pin 66 in a direction such that the exhaust valve 60 closes the exhaust gas discharge path 10.

Similar to the guide grooves 30 and 50, the exhaust valve guide groove 71 comprises two grooves, a shallow concave groove and deep concave groove that are continuous with each other at a location in the circumferential direction. A switching means that conforms to the switching means 32 (not shown in the figure) is located in the guide groove 71, and it switches the active pin 64 between the shallow concave groove and deep concave groove of the guide groove 71.

Therefore, when the active pin 64 is in the shallow concave groove of the guide groove 71 of the cam 70, the exhaust valve 60 moves upward against the first spring 65 causing one end of the arm 63 to pivot upward and the other end to pivot downward, such that the end of the arm 63 that pivots downward compresses the second spring 69, and the force of the compressed second spring 69 moves the drive pin 66 downward. By doing so, the exhaust valve 60 moves downward, and the exhaust valve 60 comes in contact with the opening 10*a* of the exhaust gas discharge path 10, closing the exhaust gas discharge path 10. On the other hand, when the active pin 66 is in the deep concave groove of the guide groove 71 of the cam 70, the force of the first spring 65 moves the active pin 64 downward, causing one end of the arm 63 to pivot downward and the other end to pivot upward, such that the end of the arm 63 that pivots upward comes in contact with the stopper pin 68 and push up the stopper pin 68, which in turn causes the drive pin 66 to move upward against the force of the second spring 69. By so doing, the exhaust valve 60 moves upward such that it moves away from the opening 10*a* of the exhaust gas discharge path 10, and opens the exhaust gas discharge path 10.

As with the drive pin 26 of the fuel-intake and circular-space closing valve drive means 21, the drive pin 66 is provided with a drive pin stopping means 37 for automatically stopping the engine 1 when the rotary engine 1reaches a specified high speed rotation. Similarly, when the electromagnet of the retaining block 38 of the drive pin stopping means 37 is magnetized, the attraction force of the bar magnets 38*a* moves the retaining block 38 against the force of the spring (not shown in the figure) to a position between the flange section 67 of the drive pin 66 and the housing 3, the retaining block 38 then comes in contact with the bottom surface of the flange section 67, stopping the operation of the drive pin 66. When the electromagnet of the retaining block 38 is demagnetized, the force of the spring moves the retaining block 38 back from between the flange section 67 of the drive pin 66 and the housing 3, and the drive pin begins operating again.

Figure 17:
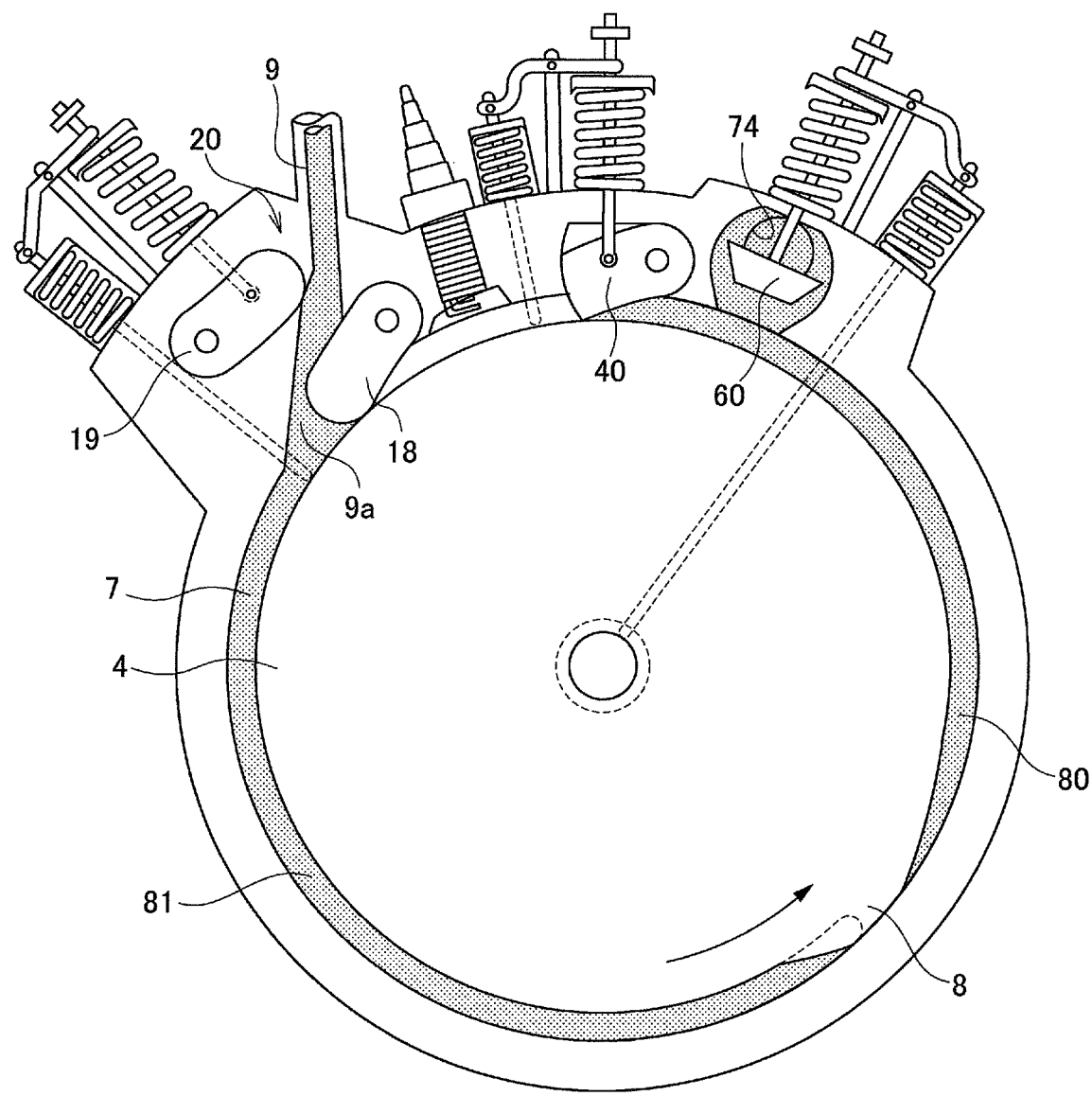
FIG. 17 is an explanative drawing showing the process of fuel intake and discharge of exhaust gas of the engine.

Having the construction described above, the rotary engine 1 of this embodiment causes the fuel-intake and circular-space closing valve 20, the explosion pressure stopper valve 40 and exhaust valve 60 to operate. On the first rotation of the rotor 4, the fuel-intake and circular-space closing valve 20 opens up the fuel-intake path 9, the circular space 7 is put into a first closable position, the explosion pressure stopper valve 40 closes the circular space 7, and the exhaust valve 60 opens the discharge path 10, and in this state, fuel 81 mixed with air is introduced into the fuel-intake path 9. After the fuel 81 has entered into the fuel-intake path 9, the pressure of the fuel 81 causes the circular-space closing valve 18 of the fuel-intake and circular-space closing valve 20 to open up the fuel-intake path 9, and the circular-space closing valve 18 closes the circular space 7 on the upstream side of the opening 9*a* of the fuel-intake path 9 in the direction of rotation of the rotor (first arrangement form of the first position). As shown in FIG. 17, as the rotor 4 rotates, pressure of the fuel and the negative pressure that occurs as the piston head 8 of the rotor 4 rotates sucks fuel 81 into the circular space 7 from the fuel-intake path 9, and the fuel 81 is led into the circular space 7 on the upstream side in the direction of rotation of the rotor. On the other hand, the combustion gas 80 that was produced during the previous explosive combustion of the fuel and that exists in the circular space 7 on the downstream side of the piston head 8 in the direction of rotation of the rotor is pushed by the piston head 8 and discharged from the discharge path 10 into the exhaust pipe 74 as exhaust gas. Therefore, on the first rotation of the rotor 4, the fuel-intake and exhaust-gas discharge process is carried out. As fuel 81 enters the circular space 7 on the upstream side from the piston head 8 in the direction of rotation of the rotor during the first rotation of the rotor 4 when starting the engine 1, air that exists in the circular space 7 on the downstream side of the piston head 8 in the direction of rotation of the rotor is discharged.

Figure 15:
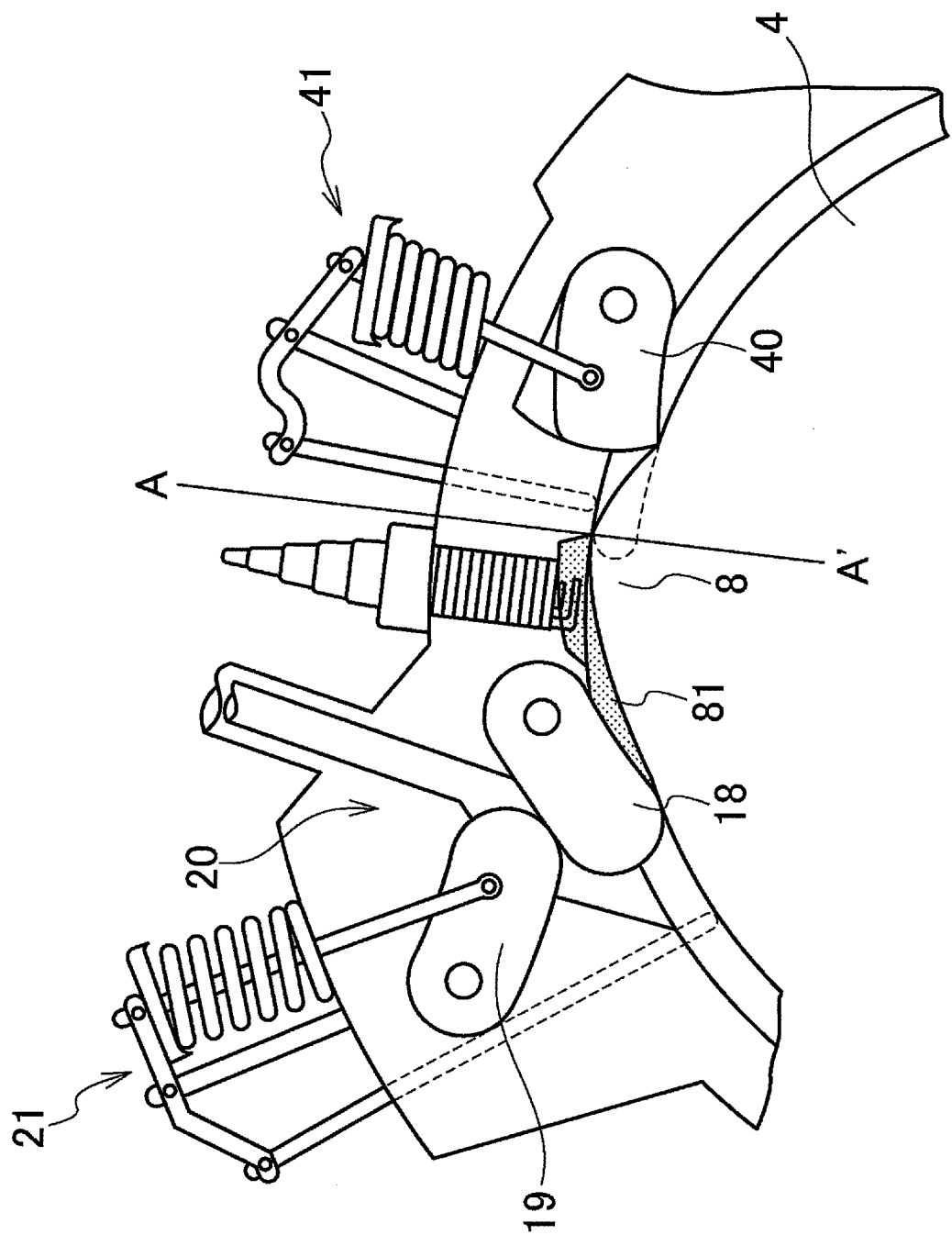
FIG. 15 is an explanative drawing showing in detail the area around the combustion chamber during the compression process of the engine.

Next, at the instant when the piston head 8 during the first rotation of the rotor 4 passes the exhaust valve 60, the exhaust valve 60 is switched and closes the discharge path 10, then as the piston head 8 passes the explosion pressure stopper valve 40, the instant that the continuous section of the explosion pressure stopper guide groove 50 on the outer surface of the rotor 4 reaches the position shown by line A-A' in FIG. 15, the explosion pressure stopper valve 40 is switched and opens the circular space 7. Furthermore, as the piston head 8 passes the fuel-intake and circular-space closing valve 20, at the instant that the continuous section of the explosion pressure stopper guide groove 50 on the outer surface of the rotor 4 reaches the position shown by line B-B' in FIG. 16, the fuel-intake and circular-space closing valve 20 is switched to the second position, and together with opening the circular space 7, blocks the fuel-intake path 9. After that, the rotor 4 starts the second rotation.

Figure 16:
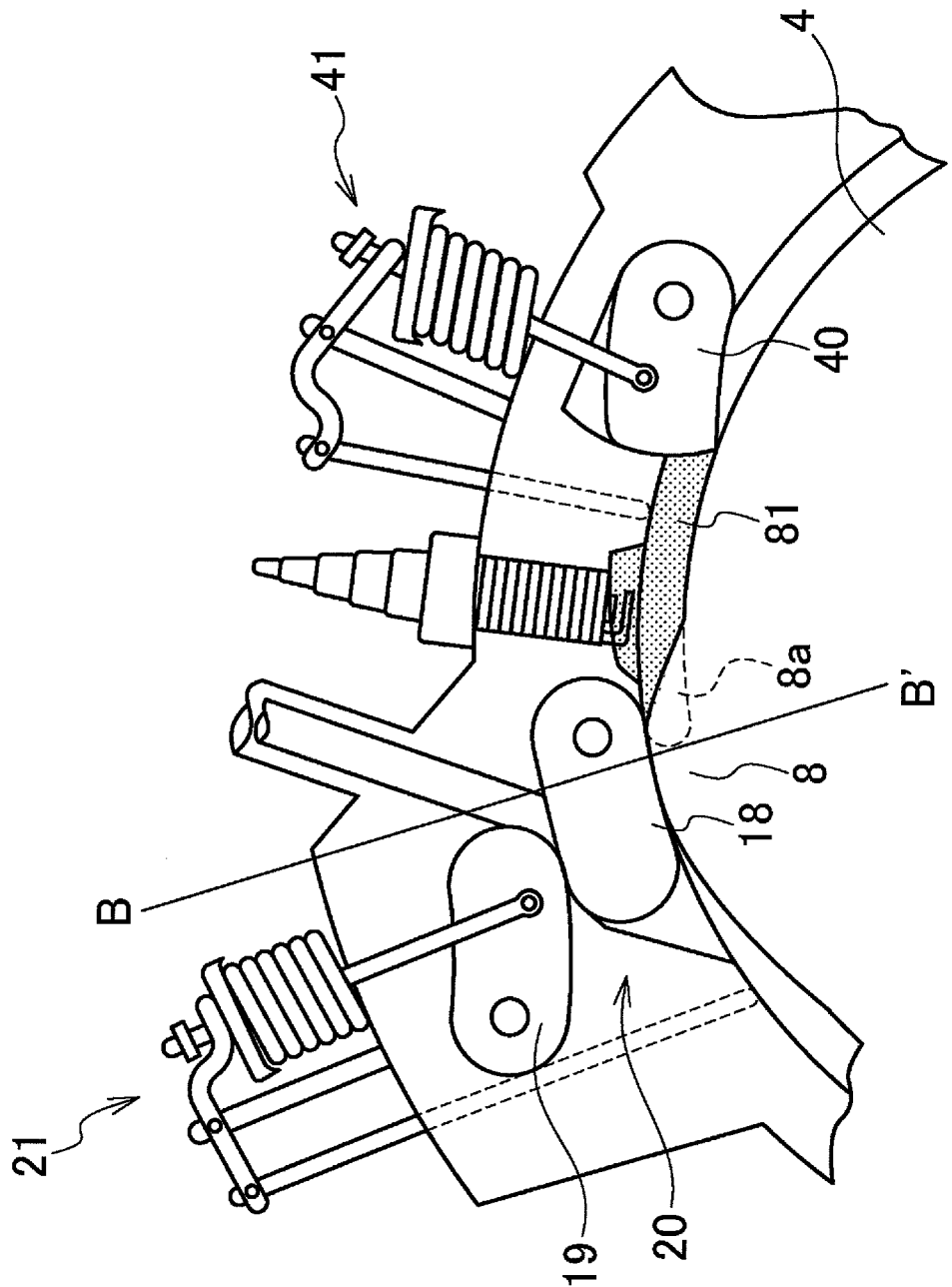
FIG. 16 is an explanative drawing showing in detail the area around the combustion chamber during the compression process.
Figure 18:
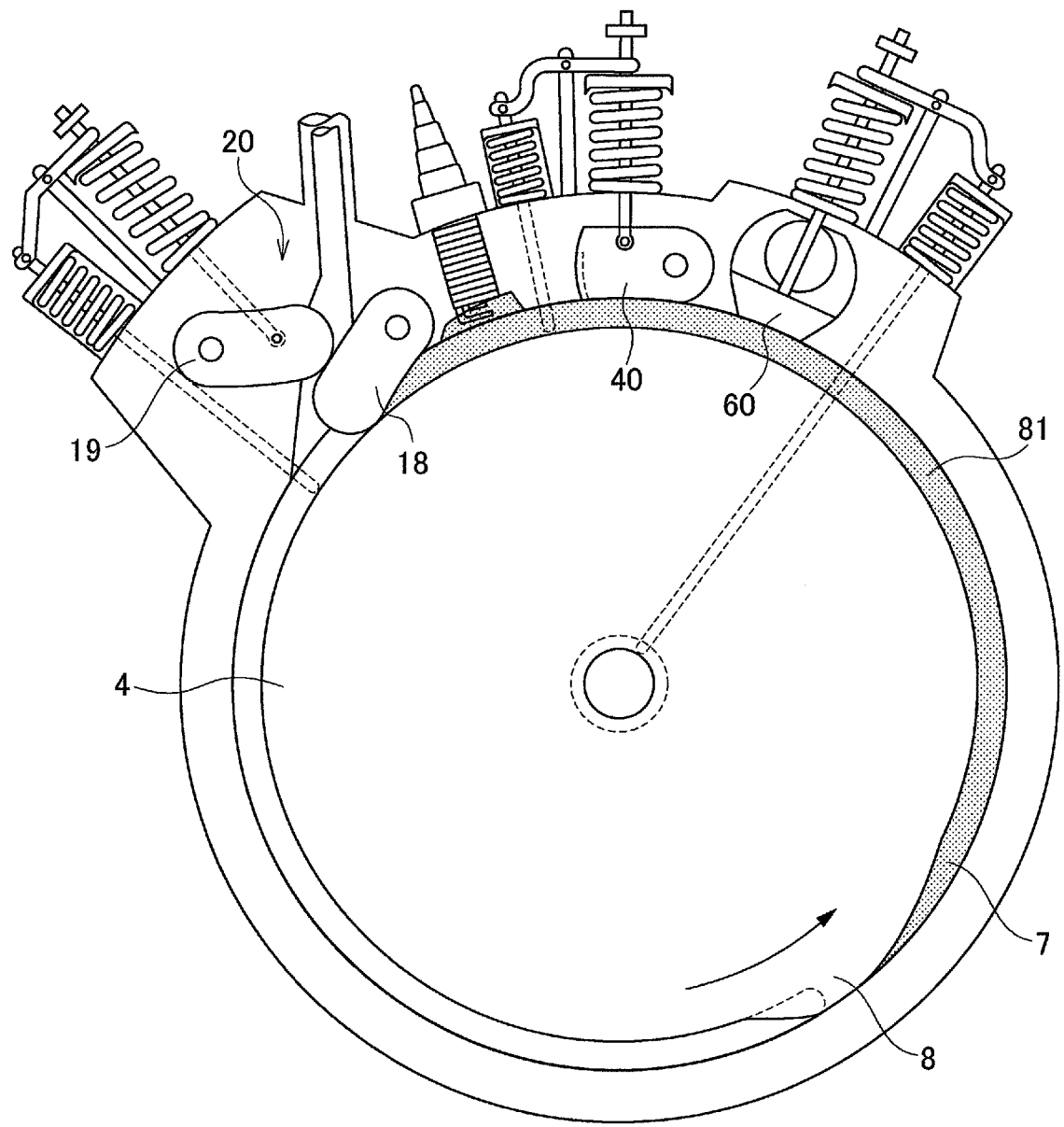
FIG. 18 is an explanative drawing showing the compression process of the engine.
Figure 19:
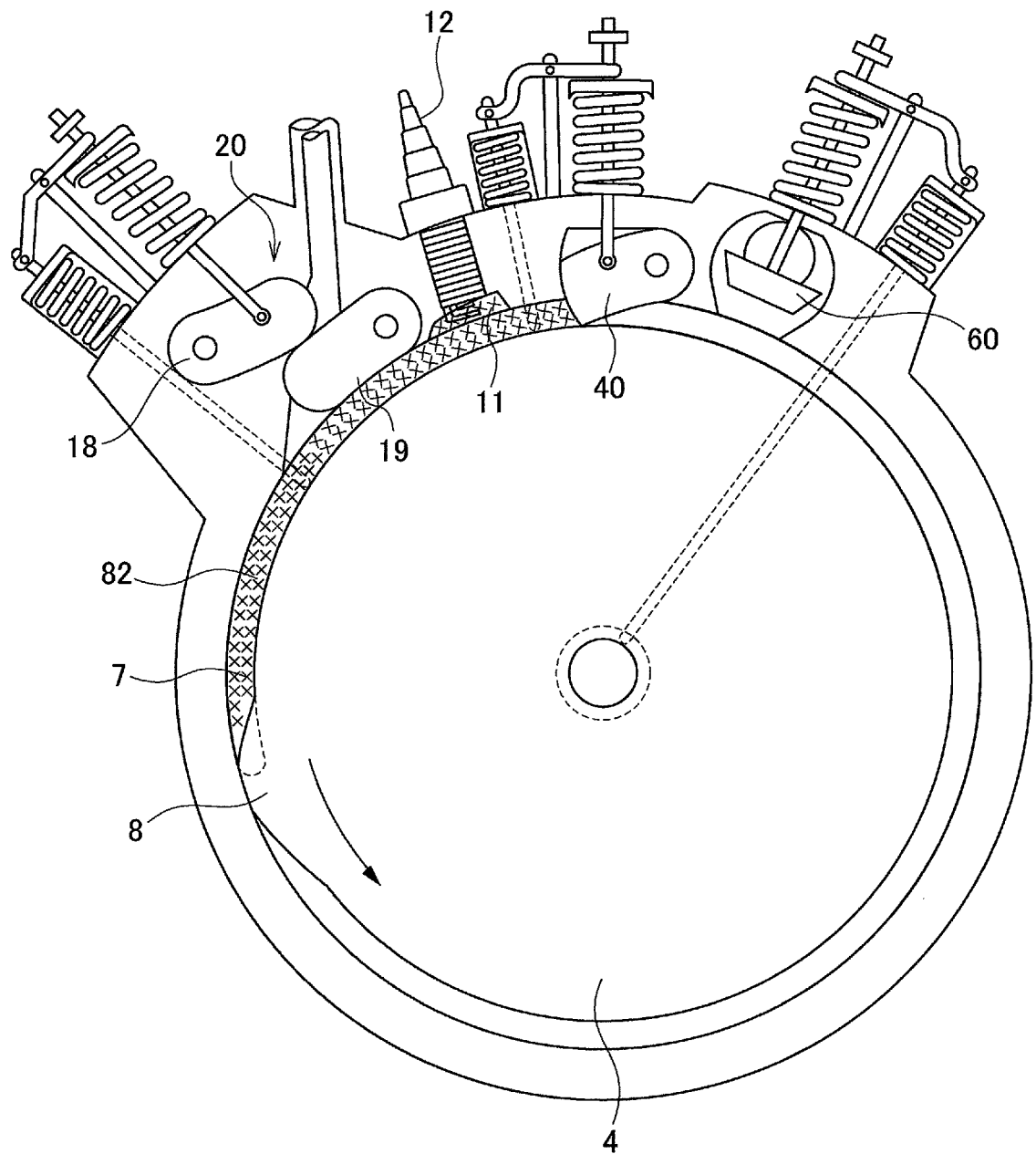
FIG. 19 is an explanative drawing showing the explosive combustion process of the engine.

The fuel 81 that has been sucked in is located in the circular space 7 on the upstream side (forward direction) of the piston head 8 in the direction of rotation of the rotor, and as shown in FIG. 18, as the rotor 4 rotates through a second rotation, the piston head 8 pushes the fuel 81 and compresses the fuel in the circular space 7 toward the fuel-intake and circular-space closing valve 20. In addition, as shown in FIG. 15, at the instant when the piston head 8 passes the explosion pressure stopper valve 40 and the continuous section of the explosion pressure stopper valve guide groove 50 on the outer surface of the rotor 4 reaches the position of line A-A' shown in FIG. 15, the explosion pressure stopper valve 40 is switched and closes the circular space 7. Next, as shown in FIG. 16, as the piston head 8 passes the combustion chamber 11, the compressed fuel 81 passes the combustion chamber 11 and is moved around to the upstream side of the piston head 8 in the direction of rotation of the rotor, and enters into the concave section 8*a* of the piston head 8 as well. Therefore, the compression process is carried out during the second rotation of the rotor 4.

When the continuous section of the fuel-intake valve guide groove 30 reaches the position shown by the line B-B' in FIG. 16 due to the rotation of the rotor 4, at that instant, the fuel-intake and circular-space closing valve 20 is switched again to the first position. By doing so, the fuel-intake valve 19 releases the pressure by the circular-space closing valve 18, and by the piston head 8 of the rotor 4 coming in contact with and pushing up on the circular-space closing valve 18, the circular-space closing valve 18 opens the closed circular space 7 and blocks the fuel-intake path 9 (second arrangement of the first position). At the same time as this, the piston head 8 that is in contact with the circular-space closing valve 18 keeps the circular space 7 in a closed state. In addition, when the electrode 13 (see FIG. 1) of the rotor 4 faces the spark plug 12 and corresponds with the electrode position on the outer plate of part of the rotor 4 of the engine 1, current flows to the spark plug and ignites the fuel 81 in the circular space 7 between the piston head 8 and the explosion pressure stopper valve 40. By doing so, the rotor 4 enters its third rotation, and as shown in FIG. 18, the high-temperature and high-pressure combustion gas 82 that is generated during explosive combustion of the fuel 81 forcefully pushes the piston head 8 from behind (upstream side in the direction of rotation of the rotor) and generates a propulsive force that drives the rotation of the rotor 4 and torque is obtained in the output shaft 5 of the rotor 4. When doing this, the concave section 52 that is formed on the front surface (upstream side in the direction of rotation of the rotor) of the explosion pressure stopper valve 40 expands making it possible for the explosion pressure stopper valve 40 to improve the tightness of the seal of the circular space 7, so it is possible to further prevent the high pressure of the combustion gas 82 that is generated by explosive combustion of the fuel 81 from leaking. Also, there is a concave section 8*a* having a vertical wall 8*b* in the radial direction of the rotor formed on the rear of the piston head 8, so it is possible to more efficiently receive the high pressure of the combustion gas 82, and thus obtain a larger propulsive force.

Next, as the piston head 8 of the rotor 4 reaches the fuel-intake and circular-space closing valve 20 during its third rotation, the explosive combustion process ends and the rotor 4 enters its fourth rotation in which the fuel-intake and exhaust-gas discharge process proceeds in the same way as in the first rotation followed by the compression process and then the explosive combustion process. In this way, the cycle of the fuel-intake and exhaust-gas discharge process, compression process and explosive combustion process is repeated. When the rotary engine 1 reaches a specified high speed rotation, a tachometer detects that, the drive pin stopping means 37 of each of the valve drive means 21, 41, 61 operates, and the retaining block 38 stops the operation of the drive pins 24, 44, 64. When the tachometer detects that the engine has dropped below the specified high speed rotation, each of the drive pin stopping means 37 operates, which releases the stoppage of the drive pins 24, 44, 64 by the retaining block 38, and the drive pins begin to operate again. In this way by combining the drive pin stopping means 37 with an electronic control device, auto operation of the engine 1 is possible.

As was explained above, the rotary engine of this embodiment 1 is constructed such that the piston head 8 is formed as a single member with the rotor 4, so when compared with a rotary engine with movable piston heads, the construction of the engine 1 can be greatly simplified. Moreover, it is possible to perform the operation of the fuel-intake and exhaust-gas discharge, compression and explosive combustion processes, as well as it is possible to stably obtain a large output. Furthermore, by providing guide grooves 30, 50 on the outer surface of the rotor 4 having shallow concave grooves and deep concave grooves that are continuous at a location in the circumferential direction, and switching the concave grooves for the active pins 24, 54 of the fuel-intake and circular-space closing valve drive means 21 and explosion pressure stopper valve drive means 51 that are inserted in the guide grooves 30, 50, the driving force for the fuel-intake and circular-space closing valve 20 and the explosion pressure stopper valve 40 is obtained by using the vertical motion of the active pins 24, 54, so when compared with the case of obtaining a driving force by providing a power transmission means such as a belt around the output shaft 5 of the engine outside of the housing 3, it is possible to make the engine more compact. Also, a drive pin stopping means 37 is provided in the fuel-intake and circular-space closing valve drive means 21, explosion pressure stopper valve drive means 41, and exhaust valve drive means 61, so when the engine 1 is rotating at high speed rotation, with a specified high speed rotation, that i s detected as a threshold, the drive pin stopping means 37 stop the operation of the respective drive pins 26, 46, 66, and operation is restarted, so automatic operation of the engine 1 is possible.

[Industrial Applicability]

The rotary engine of the present invention can be applied to the engines for various kinds of transportation such as an automobile engine, boat engine, etc.

What is claimed is:

1. A rotary engine, comprising:
a rotor housing having a cylindrical cylinder;
a fuel-intake path and an exhaust-gas discharge path opening up into said cylinder;
a combustion chamber being within an inner wall of said cylinder and formed between the openings of said fuel-intake path and said exhaust-gas discharge path;
a cylindrical flywheel rotor located on an output shaft passing through the center of said cylinder, and
wherein the cylindrical flywheel rotor forms a circular space between the flywheel rotor and inner wall of said cylinder, has a piston head that is formed at a location on the outer surface of the flywheel rotor such that said piston head comes in contact with said inner wall of said cylinder;
a spark plug provided in said cylinder with a tip end positioned inside said combustion chamber;
a free-pivoting fuel-intake valve and a free-pivoting circular-space closing valve located in said cylinder near the combustion chamber on the downstream side in the direction of rotation of the rotor configured to switch between a first position and a second position,
wherein the free-pivoting circular-space closing valve has a support shaft on the upstream side of said opening of said fuel-intake path in the direction of rotation of said rotor, the tip end thereof extending into said opening; and
wherein the free-pivoting fuel-intake valve is positioned further outward than said circular-space closing valve and has a support shaft on the downstream side of said opening of said fuel-intake path, the tip end thereof extending into said opening;
wherein said first position includes one of;
a state of opening the fuel-intake path and closing the circular space between the opening of the fuel-intake path and the opening of the combustion chamber and another state of blocking the fuel-intake path and opening the circular space, and
wherein said second position is a state of blocking the fuel-intake path and closing the circular space;
fuel-intake and circular-space closing valve drive means for operating said fuel-intake and circular-space closing valve;
an explosion pressure stopper valve located in said cylinder near said combustion chamber on the upstream side in the direction of rotation of said rotor configured to switch between closing and opening said circular space;
explosion pressure stopper valve drive means for operating said explosion pressure stopper valve;
an exhaust valve configured to open and close said discharge path; and
exhaust valve drive means for operating said exhaust valve;
wherein
a combined fuel-intake and exhaust-gas discharge stroke occurs when said free-pivoting fuel-intake valve and said free-pivoting circular-space closing valve are in said first position, said explosion pressure stopper valve closes said circular space and said exhaust valve opens said discharge path;
wherein a compression stroke occurs when said free-pivoting fuel-intake valve and said free-pivoting circular-space closing valve are in said second position, said explosion pressure stopper valve opens said circular space and said exhaust valve closes said discharge path; and
wherein a combustion stroke occurs when said free-pivoting fuel-intake valve and said free-pivoting circular-space closing valve are in said first position, said explosion pressure stopper valve closes said circular space, and
in said explosive combustion process said spark plug fires.

2. The rotary engine of claim 1, wherein
said free-pivoting fuel-intake valve pivots inward from said cylinder towards the rotor and said free-pivoting circular-space closing valve protrudes from said cylinder towards the rotor and closes said circular space, said free-pivoting fuel-intake valve and said free-pivoting circular-space closing valve come in contact with each other and close said fuel-intake path; and
wherein when said free-pivoting fuel-intake valve pivots outward away from the rotor and said free-pivoting circular-space closing valve moves back towards said cylinder away from the rotor, said free-pivoting circular-space closing valve comes in contact with said free-pivoting fuel-intake valve and closes said fuel intake path; and
wherein when said free-pivoting circular-space closing valve protrudes into said circular space and closes the circular space, said free-pivoting circular-space closing valve opens said fuel-intake path.

3. The rotary engine of claim 2 wherein
said fuel-intake and circular-space closing valve drive means comprises:
a support rod fixed to said housing;
an arm provided at the top end of said support rod such that it pivots freely;
an active pin axially supported by one end of said arm, another tip end of said arm being inserted into a fuel-intake guide groove comprising two grooves, a shallow concave groove and deep concave groove, formed around the outer surface of said rotor and are continuous with each other at a location in the circumferential direction, and forced toward said guide grooves by a first spring;

switching means for switching said active pin between the shallow concave groove and deep concave groove of said guide groove; and a drive pin engaged at one end with said fuel-intake valve such that the other end of said drive pin loosely fits through a hole that is located on the other end of said arm, wherein the drive pin comprises a flange section on the bottom of said drive pin and a stopper pin in a section that protrudes outward from said arm, with a second spring being located between said arm and said flange section such that the second spring applies a force in a direction that causes said fuel-intake valve to close said fuel-intake path;

wherein when said active pin is inserted into the deep concave groove of said guide groove, said drive pin is moved via said arm and said stopper pin in the direction that causes said free-pivoting fuel-intake valve to open said fuel-intake path, and when said active pin is inserted in the shallow concave groove of said guide groove, said drive pin is moved via said arm and said second spring in the direction that causes said free-pivoting fuel-intake valve to close said fuel-intake path, and said free-pivoting fuel-intake valve moves said free-pivoting circular-space closing valve in a direction that closes said circular space.

4. The rotary engine of claim 1 wherein said explosion pressure stopper valve drive means comprises:

a support rod fastened to said housing;

an arm provided at the top end of said support rod such that it pivots freely;

an active pin axially supported by one end of said arm, another tip end of said arm being inserted into an explosion pressure stopper valve guide groove that comprises two grooves, a shallow concave groove and deep concave groove, formed around the outer surface of said rotor and are continuous with each other at a location in the circumferential direction, and forced toward said guide grooves by a first spring;

switching means for switching said active pin between the shallow concave groove and deep concave groove of said guide groove; and a drive pin engaged at one end with said explosion pressure stopper valve such that the other end of said drive pin loosely fits through a hole located on the other end of said arm, wherein said drive pin comprises a flange section on the bottom of said pin and a stopper pin in the section that protrudes outward from said arm, with a second spring being located between said arm and said flange section such that the second spring applies a force in a direction that causes said explosion pressure stopper valve to close said circular space; wherein when said active pin is inserted into the deep concave groove of said guide groove, said drive pin is moved via said arm and said stopper pin in the direction that causes said explosion pressure stopper valve to open said circular space, and when said active pin is inserted in the shallow concave groove of said guide groove, said drive pin is moved via said arm and said second spring in the direction that causes said explosion pressure stopper valve to close said circular space.

5. The rotary engine of claim 1 wherein said exhaust valve drive means comprises:

a support rod fastened to said housing;

an arm provided at the top end of said support rod such that it pivots freely;

a cam fastened to the output shaft of said rotor;

an active pin axially supported by one end of said arm, another tip end of said arm being inserted into an exhaust valve guide grooves that comprises two grooves, a shallow concave groove and deep concave groove, formed around the outer surface of said cam and are continuous with each other at a location in the circumferential direction, and forced toward said guide grooves by a first spring;

switching means for switching said active pin between the shallow concave groove and deep concave groove of said guide groove; and a drive pin that engaged at one end with said exhaust valve such that the other end of said drive pin loosely fits through a hole located on the other end of said arm and comprises a flange section on the bottom of said drive pin and a stopper pin in the section that protrudes outward from said arm, with a second spring being located between said arm and said flange section such that the second spring applies a force in a direction that causes said exhaust valve to close said exhaust gas discharge path; wherein when said active pin is engaged in the deep concave groove of said cam, said drive pin is moved via said arm and said stopper pin in the direction that opens said exhaust gas discharge path, and when said active pin is engaged in the shallow concave groove of said cam, said drive pin is moved via said arm and said second spring in the direction that closes said exhaust gas discharge path.

6. The rotary engine of claim 3, 4 or 5 further comprising drive pin stopping means having a retaining block movable along the circumferential direction of the engine at the bottom of said drive pin, wherein by moving that retaining block in between said flange section and said housing, operation of said drive pin stops.

7. The rotary engine of claim 1 wherein said explosion pressure stopper valve further comprises a concave section on a surface on the downstream side in the direction of rotation of said rotor.

* * * * *